(12) United States Patent
Powers et al.

(10) Patent No.: US 9,002,535 B2
(45) Date of Patent: Apr. 7, 2015

(54) NAVIGATION PORTALS FOR A REMOTE VEHICLE CONTROL USER INTERFACE

(75) Inventors: Aaron Powers, Wayland, MA (US);
Justin Kearns, Somerville, MA (US);
Robert Todd Pack, Nashua, NH (US);
Orjeta Taka, Peabody, MA (US); Eben Rauhut, Watertown, MA (US);
Marshall Vale, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 563 days.

(21) Appl. No.: 13/105,883

(22) Filed: May 11, 2011

(65) Prior Publication Data
US 2012/0072052 A1    Mar. 22, 2012

Related U.S. Application Data

(60) Provisional application No. 61/333,734, filed on May 11, 2010.

(51) Int. Cl.
*G05D 1/00*     (2006.01)
*G06F 3/0481*   (2013.01)
*G05D 1/02*     (2006.01)

(52) U.S. Cl.
CPC .......... *G06F 3/04815* (2013.01); *G05D 1/0044* (2013.01); *G05D 1/024* (2013.01); *G05D 1/0251* (2013.01); *G05D 1/027* (2013.01); *G05D 1/0272* (2013.01); *G05D 1/0274* (2013.01); *G05D 1/0278* (2013.01); *G05D 2201/0207* (2013.01)

(58) Field of Classification Search
USPC ................. 701/2, 27; 398/106; 700/245, 246; 715/700, 757; 342/54, 70
See application file for complete search history.

(56) References Cited

U.S. PATENT DOCUMENTS

| | | | | |
|---|---|---|---|---|
| 7,317,987 | B2* | 1/2008 | Nahla | 701/301 |
| 7,693,654 | B1* | 4/2010 | Dietsch et al. | 701/461 |
| 2001/0037163 | A1* | 11/2001 | Allard | 700/245 |
| 2005/0216181 | A1* | 9/2005 | Estkowski et al. | 701/200 |
| 2006/0027404 | A1* | 2/2006 | Foxlin | 178/18.06 |
| 2007/0130599 | A1* | 6/2007 | Monroe | 725/105 |
| 2008/0027590 | A1* | 1/2008 | Phillips et al. | 701/2 |
| 2008/0027591 | A1* | 1/2008 | Lenser et al. | 701/2 |
| 2008/0086236 | A1 | 4/2008 | Saito et al. | |
| 2008/0134056 | A1* | 6/2008 | Shuster | 715/757 |
| 2008/0294288 | A1* | 11/2008 | Yamauchi | 700/258 |
| 2009/0234499 | A1* | 9/2009 | Nielsen et al. | 700/250 |
| 2009/0276105 | A1* | 11/2009 | Lacaze et al. | 701/2 |
| 2009/0289591 | A1* | 11/2009 | Kassow et al. | 318/568.13 |
| 2009/0325606 | A1* | 12/2009 | Farris | 455/456.3 |

(Continued)

OTHER PUBLICATIONS

Office Action for Australian Patent Application No. 2011293447, dated Nov. 4, 2013.

*Primary Examiner* — James Trammell
*Assistant Examiner* — Majdi Alsomiri
(74) *Attorney, Agent, or Firm* — Honigman Miller Schwartz and Cohn LLP

(57) ABSTRACT

An operator control unit has a user interface that allows a user to identify a mode of display and interaction that narrows the user's options for his next interaction with the user interface. The user interface utilizes portals to transition between environments such as indoors to outdoors, outdoors to indoors, different rooms of a building, and different floors of a building, the portals representing one or more of stairways and doors, and being used in remote vehicle path planning as waypoints that may require execution of predetermined behaviors.

18 Claims, 27 Drawing Sheets

(56) References Cited

U.S. PATENT DOCUMENTS

| | | | |
|---|---|---|---|
| 2010/0066587 A1* | 3/2010 | Yamauchi et al. | 342/70 |
| 2010/0287178 A1* | 11/2010 | Lambert et al. | 707/765 |
| 2011/0211040 A1* | 9/2011 | Lindemann et al. | 348/36 |
| 2011/0214072 A1* | 9/2011 | Lindemann et al. | 715/757 |

* cited by examiner

NAVIGATION PORTALS FOR A REMOTE VEHICLE CONTROL USER INTERFACE

INTRODUCTION

This patent application claims priority to U.S. Provisional Patent Application No. 61/333,734, filed May 11, 2010, titled Navigation Portals for a Remote Vehicle Control User Interface, the entire content of which is incorporated by reference herein.

The present teachings relate to a navigation portal for a remote vehicle control user interface. Embodiments of the present teachings relate more particularly to using portals in remote vehicle navigation to transition between outdoor (e.g., GPS-based) navigation and indoor (e.g., SLAM-based mapping) navigation and mapping. The present teachings also relate to mapping floor transitions of buildings (e.g., stairs).

BACKGROUND

Current autonomous robotic systems typically work only for outdoor (e.g., GPS-based) mapping or for indoor (e.g., SLAM-based) mapping. Existing remote vehicles cannot transition automatically and seamlessly between indoor and outdoor navigation.

SUMMARY

The present teachings provide an operator control unit having a user interface that allows a user to identify a mode of display and interaction that narrows the user's options for his next interaction with the user interface. The user interface utilizes portals to transition between environments such as indoors to outdoors, outdoors to indoors, different rooms of a building, and different floors of a building, the portals representing one or more of stairways and doors, and being used in remote vehicle path planning as waypoints that may require execution of predetermined behaviors.

The present teachings also provide a navigation portal for a remote vehicle control user interface, the navigation portal being located in a map and facilitating transition of the remote vehicle between a first environment located in the map and a second environment located in the map, the navigation portal representing one of a stairway and a door. When the remote vehicle is located in the first environment and an operator of the remote vehicle uses the remote vehicle control interface to designate a destination for the remote vehicle in the second environment, the remote vehicle plans and traverses a path to the destination via the navigation portal.

The present teachings further provide a method for mapping and navigating with a remote vehicle using a remote vehicle control user interface and navigation portals. The method comprises: using GPS for navigation in an outdoor environment; using a laser range finder and SLAM for navigation and mapping in an indoor environment; creating a navigation portal when the remote vehicle switches from an indoor environment to an outdoor environment, the navigation portal including information regarding the environment switch; creating a navigation portal when the remote vehicle switches from an outdoor environment to an indoor environment, the navigation portal including information regarding the environment switch; using a door opening behavior when a door is encountered during navigation and mapping; creating a navigation portal when a door is encountered during navigation and mapping, the navigation portal including instructions to implement a door opening behavior; using a stair climbing or stair descending behavior when a stairway is encountered during navigation and mapping; and creating a navigation portal when a stairway is encountered during navigation and mapping, the navigation portal including instructions to implement a stair climbing or stair descending behavior.

Additional objects and advantages of the present teachings will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

DESCRIPTION

Figure 1:
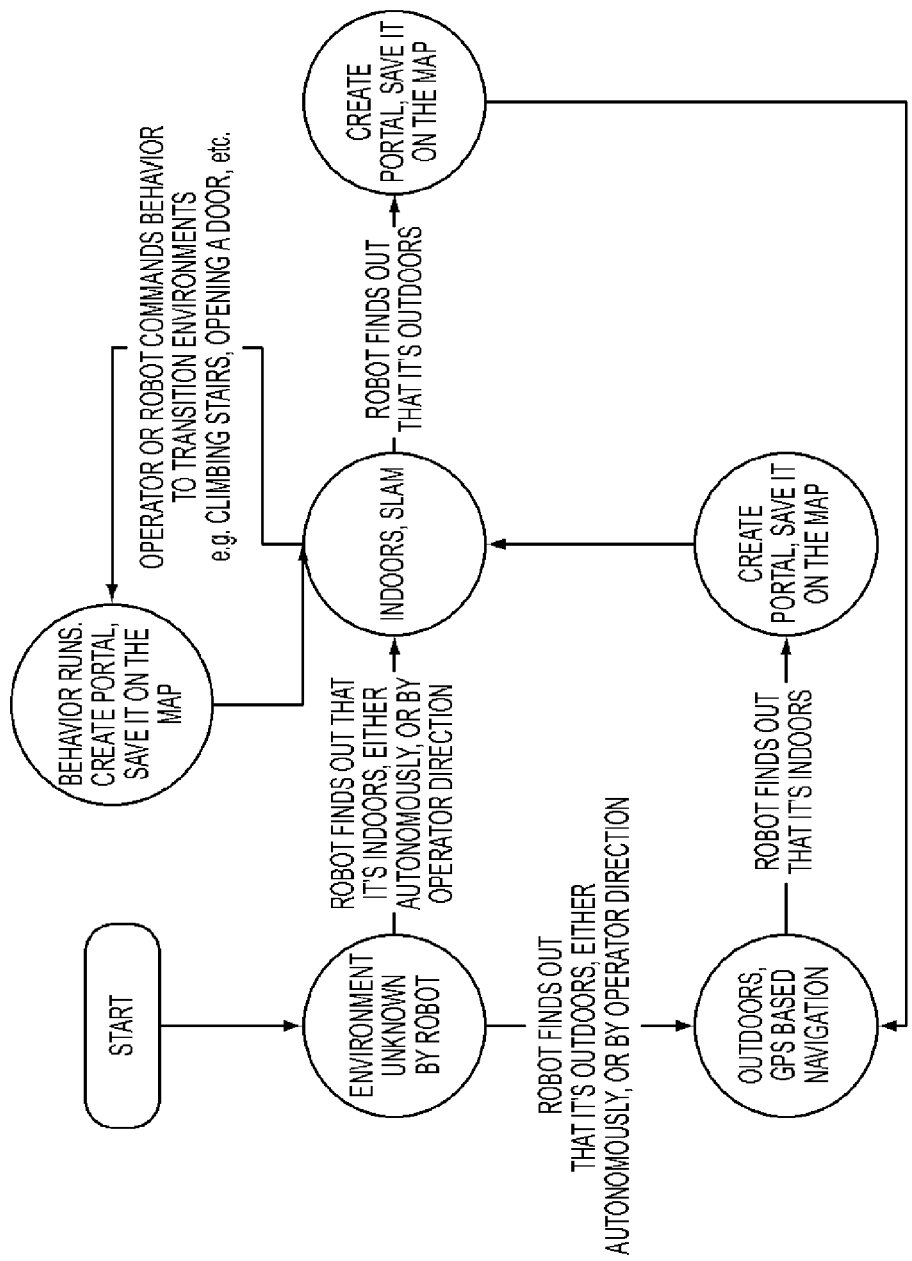
FIG. 1 is a flowchart illustrating an exemplary method by which a robotic system can create portals.

Reference will now be made in detail to embodiments of the present teachings, examples of which are illustrated in the accompanying drawings.

The term remote vehicle, as used herein, comprises vehicles that can be controlled by a remote operator. An exemplary remote vehicle is a robot. A remote vehicle can comprise environment sensors such as, for example, a laser range finder, a stereo vision camera, a GPS, and an IMU. Remote vehicles can be completely autonomous and recognize portals as they are encountered, or an operator with an operator control unit (OCU) can identify where portals should be placed.

An environment can be defined as a physical area that has a defined coordinate system with a localization strategy and a planning strategy, each of which is effective for its environment. For example, an outdoor environment can comprise a GPS-based coordinate system with a waypoint planning path strategy and GPS-based localization. An indoor environment can comprise a planar laser-based Simultaneous Localization and Mapping (SLAM) strategy to define its coordinate system, and can utilize path planning. Other environments can use, for example, a 3D-based SLAM or SLAM for a predetermined remote vehicle sensor.

A portal can be defined as a transition point between two environments, which can be associated with a behavior that allows automatic transition between the two environments. In certain embodiments, portals can establish coordinate system anchor points that allow the remote vehicle into a new coordinate system after portal transition. For example, an upstairs portal can be associated with a stair climbing behavior, and a door portal can be associated with a door opening behavior. Portals give hints to the robot that allow it to transition automatically between different kinds of navigation and behaviors. The portals allow the robot to automatically transition between different spaces, for example directly from a location outdoors to a precise point on the $3^{rd}$ floor of a building with a single click.

Autonomous robots typically need to use different types of navigation in different types of environments. The two key types are:
  Outdoor navigation—presently primarily using GPS for navigation, for example assisted by gyrodometry and by stereo vision camera for obstacle avoidance, hill detection, etc.
  Indoor navigation—presently primarily using a laser range finder and SLAM, for example assisted by gyrodometry. A stereo vision camera can be used for some obstacle avoidance, but may be weighted less than the laser range finder, which is more accurate in indoor environments.

Autonomous remote vehicles can utilize different autonomous and/or semi-autonomous behaviors in navigating between different environments, for example climbing stairs, descending stairs, and opening doors.

Remote vehicles can ascend stairways, open doors and traverse doorways, or other kinds of transitions that can allow the remote vehicle to travel between one place and another seamlessly. For example, a remote vehicle with stair climbing ability can climb stairs indoors and get to a new floor, where the remote vehicle would need to start a new map for the new floor of the building.

An operator may only want to navigate an environment or an entire building or site once via teleoperation, and have that initial teleoperated navigation "teach" the remote vehicle how to transition between environment(s). If the remote vehicle remembers where the transition points (i.e., the portals) are, the remote vehicle can transition automatically between environments, including driving to and traversing doorways and stairways.

The present teachings provide a navigation portal for a remote vehicle control user interface. Embodiments of the present teachings use portals in remote vehicle navigation to transition between outdoor (e.g., GPS-based) navigation and indoor (e.g., SLAM-based mapping) navigation and mapping. The present teachings can also use portals in remote vehicle navigation to map building floor transitions (e.g., stairs).

A robotic system can use portals for navigation in accordance with embodiments of the present teachings by starting the remote vehicle in a known environment. When the remote vehicle is directed to a different environment (e.g., a user has requested the remote vehicle move to a new location or the remote vehicle made the decision itself), the remote vehicle finds portals connecting environments, and paths to portals in the environments. The remote vehicle can optionally evaluate multiple environments searching for a shortest available path to a goal environment. The remote vehicle can then travel to a portal entrance from its current environment, using its environment coordinate system planning, and localization strategy. At the portal, the remote vehicle can initiate a behavior associated with the portal, if necessary. When the portal behavior finishes, the remote vehicle has a probabilistic hypothesis of its position and orientation in the new environment's coordinate system. The remote vehicle can start a new localization and planning strategy in that environment. The remote vehicle can continue through multiple environments through multiple portals in the above manner until it reaches its goal.

FIG. 1 illustrates a method by which a robotic system can create portals. Upon starting, the robotic system enters or recognizes an environment unknown to the remote vehicle. The robotic system then uses various sensors, as would be understood by those skilled in the art, to determine whether it is indoors or outdoors. If the robotic system determines that the remote vehicle is outdoors and operating autonomously or via teleoperation, outdoor (e.g., GPS-based) navigation is employed by the robotic system to traverse the environment and build a map. If, during outdoor navigation, the remote vehicle senses that it has passed indoors (i.e., to a new environment), it creates a portal between the two environments and saves the portal on the map. Thereafter, the remote vehicle employs indoor (e.g., SLAM) navigation to traverse the environment and continue building the map. If, during indoor navigation, the remote vehicle senses that it has passed outdoors (i.e., to a new environment), it creates a portal between the two environments and saves the portal on the map, and then employs outdoor navigation to traverse the environment and continue building the map.

If upon startup, the remote vehicle first determines that it is indoors, the robotic system initially employs indoor (e.g., SLAM) navigation while navigating the environment and building a map thereof. Thereafter, if the remote vehicle transitions to an outdoor environment, a portal is created and the mapping and navigation process continues in the manner set forth above. While navigating and mapping indoors, if the remote vehicles autonomous controls or an operator detect an obstacle such as stairs or a door that can signify a transition between two environments, a portal can be created and saved on the map to indicate such a transition and the remote vehicle continues navigating and mapping via indoor (e.g., SLAM) navigation.

A basic example scenario is as follows: (1) the operator turns the remote vehicle on outdoors and tells the robot that it is "starting outdoors" so that the remote vehicle uses the GPS to navigate (alternatively, as stated above, the remote vehicle can use sensors to determine that it is outside); (2) the operator drives (via teleoperation) the remote vehicle just inside the edge of a building, and then tells the remote vehicle that the robot is indoors so that the remote vehicle can automatically create an indoor/outdoor portal at that location and switch itself to indoor navigation and mapping; (3) the operator drives the remote vehicle to a stairway and commands the remote vehicle to drive up the stairs, whereupon the remote vehicle automatically creates an upstairs portal in the $1^{st}$ floor SLAM map, starts a new map on the $2^{nd}$ floor, and creates a downstairs portal in the $2^{nd}$ floor SLAM map; (3) the operator clicks once outside the building at any location and the remote vehicle plans out its path all the way from the $2^{nd}$ floor to the designated outdoor location, going downstairs and outdoors, and automatically transitioning its navigational state at each portal.

A navigation and mapping scenario can be more complex and the remote vehicle can still automatically navigate itself between portals using portal navigation. For example, there might be more than one set of stairs that lead between two floors, or there might be more than one doorway into or out of a building. Each time the operator indicates where the portal is to the remote vehicle, the remote vehicle automatically remembers the portal's location.

Natural Automatically Learning User Interface: From an operator's perspective, a robotic system in accordance with the present teachings can provide a natural and simplified interface. The operator does not need to tell the remote vehicle that "there's an indoor/outdoor portal here" or that "there's a stairway portal there." The remote vehicle simply learns recognizes a portal when the operator tells the remote vehicle to go upstairs or downstairs, and recognizes a portal when the operator tells it to change between indoor/outdoor mapping. Automatically recognizing and mapping portals provides a seamless and intuitive user interface decreasing the burden on the operator. The user interface can also be designed in a way that does not require all portal types to be displayed. For example, the operator would probably need to know where upstairs & downstairs portals are to see between maps, but the user interface would not necessarily need to display the paths between the upstairs and downstairs portals, and might instead display the maps in a way that intuitively represents linked stairways by positional placement (i.e., by placing a $2^{nd}$ floor visually directly above a $1^{st}$ floor, which visually lines up the stairways). In addition, indoor/outdoor transitions can be clearly indicated by a missing portion of a wall (i.e., a gap in the wall) in a map constructed by the remote vehicle.

Figure 2:
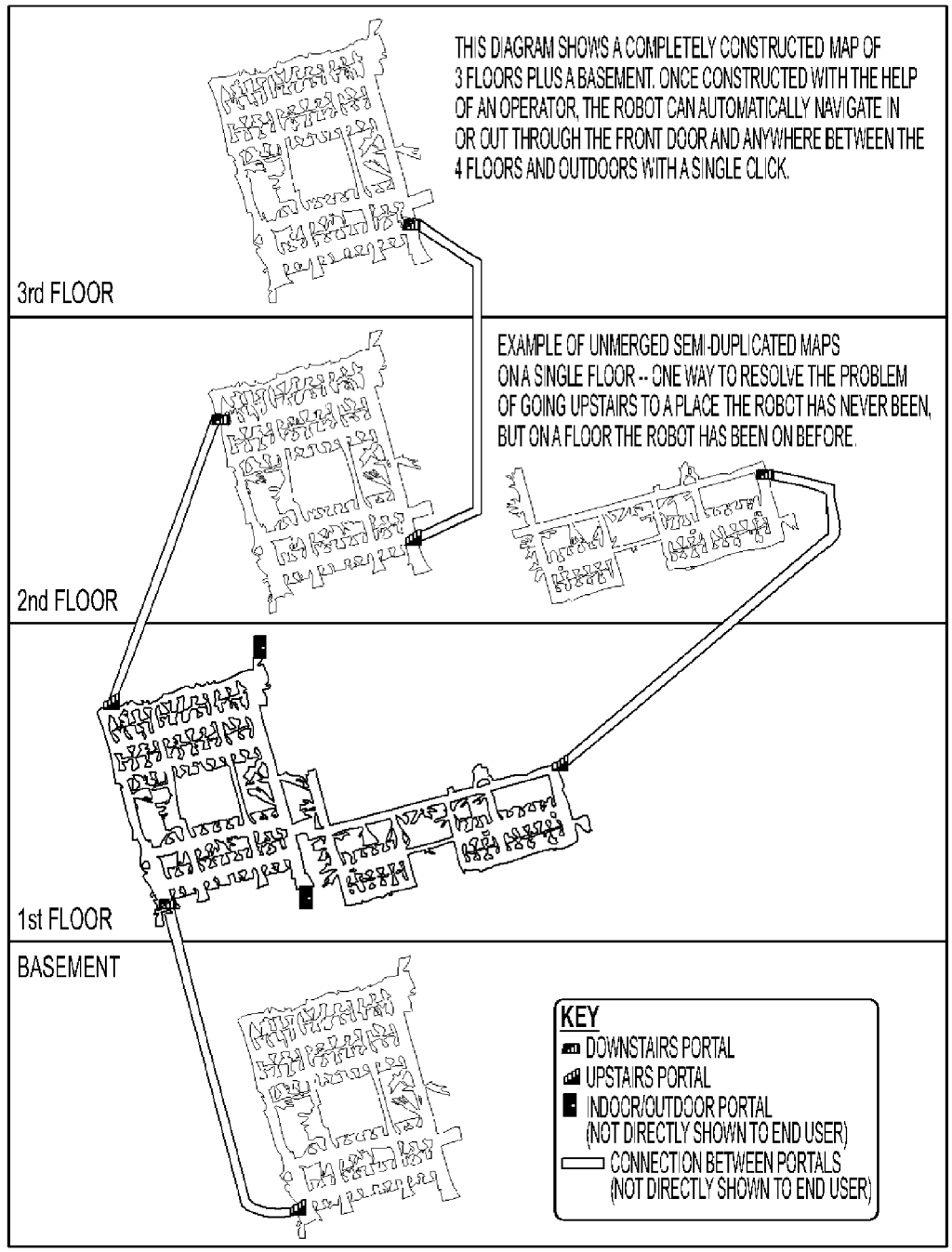
FIG. 2 illustrated an exemplary map of a three-story building, created by a remote vehicle in accordance with certain aspects of the present teachings.

Referring to FIG. 2, in a mapped environment where the remote vehicle can go to the same floor twice by two different stairways, the operator can map a complete $1^{st}$ floor environment and then command the remote vehicle to climb stairs to a $2^{nd}$ floor and map only one half of the $2^{nd}$ floor (the left half of the $2^{nd}$ floor map in FIG. 2). The remote vehicle can then be commanded to ascend the stairs and map a $3^{rd}$ floor. The remote vehicle can then be commanded to descend stairs from the $3^{rd}$ floor to the first floor. The remote vehicle then locates another stairwell to the $2^{nd}$ floor, leading to a part of the $2^{nd}$ floor environment that the remote vehicle has not previously traversed (the right half of the $2^{nd}$ floor map in the diagram above). In this scenario, the remote vehicle never goes across the same space on the $2^{nd}$ floor, and therefore does not know whether the separate parts of the $2^{nd}$ floor are connected or if there is a wall between them. The remote vehicle keeps the two halves of the $2^{nd}$ floor map separate. In this scenario, how would the remote vehicle navigate from the $2^{nd}$ floor's right half to the $3^{rd}$ floor? The remote vehicle can employ portal navigation to map a route from the $2^{nd}$ floor to the $1^{st}$ floor, then back to the $2^{nd}$ floor and use the known portal (stairs) to the $3^{rd}$ floor. This path works well if there was a wall between the two halves of the $2^{nd}$ floor.

In certain embodiments, the present teachings contemplate recognizing that the two $2^{nd}$ floor maps almost overlap, and having the remote vehicle attempt to discover a connection point between the two $2^{nd}$ floor maps. If the remote vehicle discovers a connection point and can traverse between the two $2^{nd}$ floor maps, the remote vehicle can automatically merge the two $2^{nd}$ floor maps into one map and take a shorter route for the above scenario.

Figure 3:
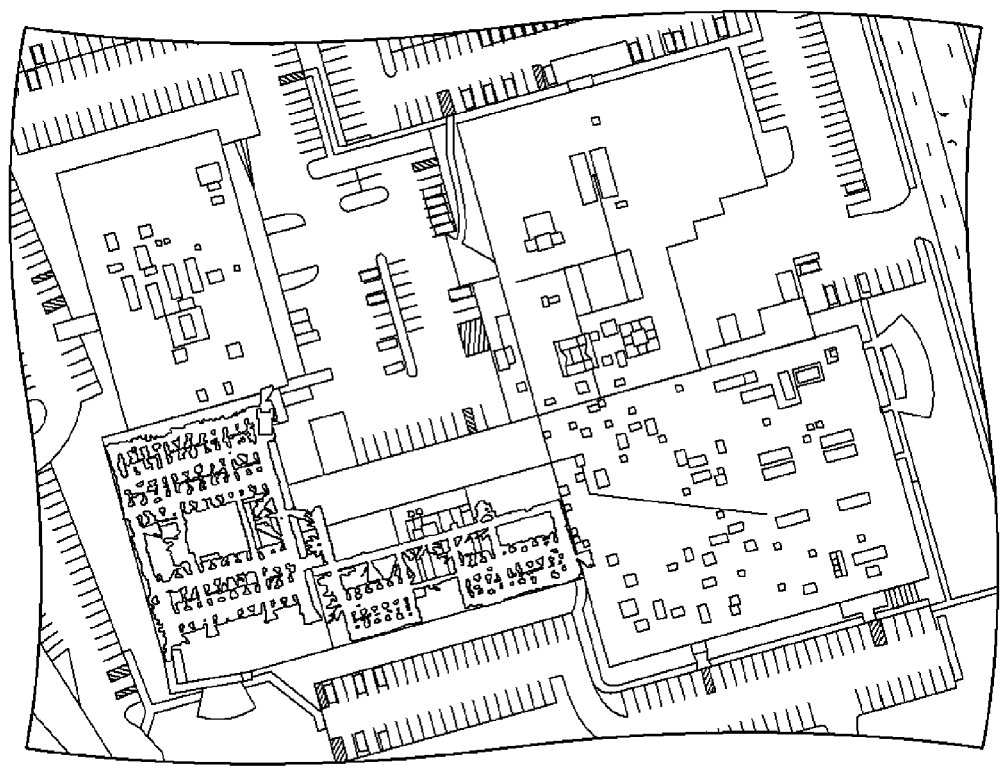
FIG. 3 illustrates a map created in accordance with aspects of the present teachings, which has been layered on top of satellite imagery of the mapped building.

Various embodiments of the present teachings contemplate automatically layering a constructed map on top of satellite imagery. When the remote vehicle is directed to transition between indoor and outdoor mapping, it can create a portal between the indoor and outdoor maps. The remote vehicle can also integrate its gyrodometry and GPS data in order to visibly rotate the indoor map and place it precisely layered on top of a satellite image. An example of such a layered indoor map is illustrated in FIG. 3.

In embodiments of the present teachings, wherein GPS precision is not enough to accurately place the map on top of the building, the operator can intervene and help "nudge" the GPS in a selected direction (e.g., up to 10 meters, which is a typical GPS offset within a particular GPS session). The robotics system can then display the indoor map and the robot in the correct and accurate place, which will be helpful for the next session.

Figure 4:
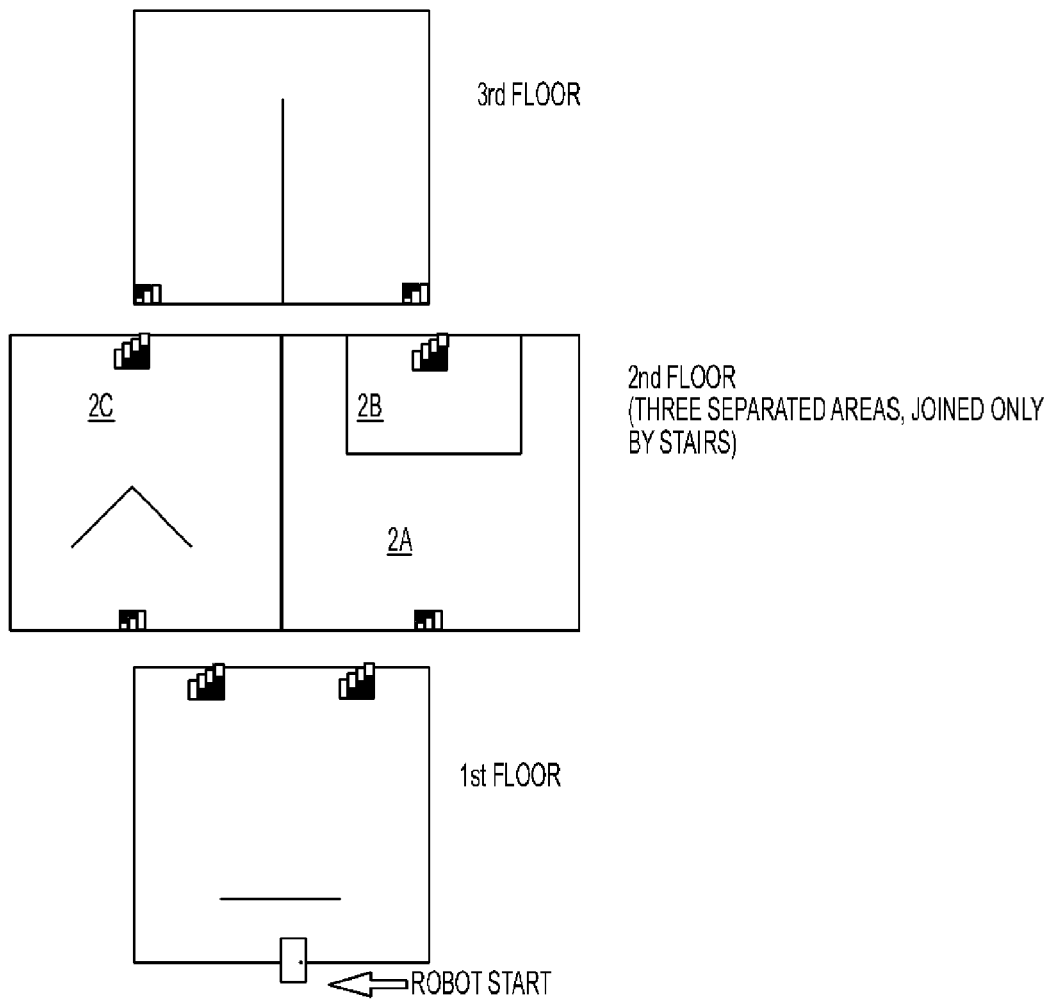
FIG. 4 schematically illustrates a three-story building having stair transitions between floors and which can me mapped an navigated by a remote vehicle in accordance with various aspects of the present teachings.

In embodiments of the present teachings, a robotics system can navigate a remote vehicle through multiple floors and obstacles, such as the multi-floor map of FIG. 4, the multiple floors being connected by stairways that the remote vehicle generated through SLAM and mapped as portals. The multi-floor map of FIG. 4 has three separate sections of the $2^{nd}$ floor—2A, 2B, and 2C, which are only connected by stairwells on other floors, as far as the remote vehicle knows. The remote vehicle sees obstacles between areas 2A, 2B, and 2C. In certain embodiments, the remote vehicle can intelligently map between these areas and portals. For example, if the remote vehicle is outside of a building on the bottom of the first floor map of FIG. 3, and is asked to go to 2B, the remote vehicle can use portal navigation to go inside the front door from outdoors, SLAM navigation to map around the obstacle (drawn as a horizontal line) on the $1^{st}$ floor, portal navigation to try going straight from the $1^{st}$ floor to 2A, SLAM navigation to realize it can't get from 2A to 2B, portal navigation to try going into 2C, and then to the $3^{rd}$ floor, and then to 2B, and SLAM navigation to get around obstacles in 2C (drawn as a $\wedge$) and to the $3^{rd}$ floor. This general approach of mixing portal navigation, GPS navigation, and SLAM can allow a remote vehicle to navigate between a diverse set of environments, not limited to those presented above.

In accordance with various embodiments, the intended path of remote vehicle can be visible to the end user as a dashed line, which changes at each stage of the mapping process to become more accurate as the remote vehicle gets closer. Even though the mapping process may take time, the remote vehicle can start out on a first leg of the trip immediately and transition to the most effective, or only known path.

The present teachings contemplate embodiments having different portal types for doors that need to and can be opened, and doors that are already open. Outdoor stairwells can additionally be recognized as portals, as can elevators.

The present teachings also contemplate utilizing certain exploratory behaviors to improve mapping. For example, automatic exploration and automatic discovery of stairwells using suitable sensor technology (e.g., stereo vision) can be implemented on the robotic system.

Figure 5:
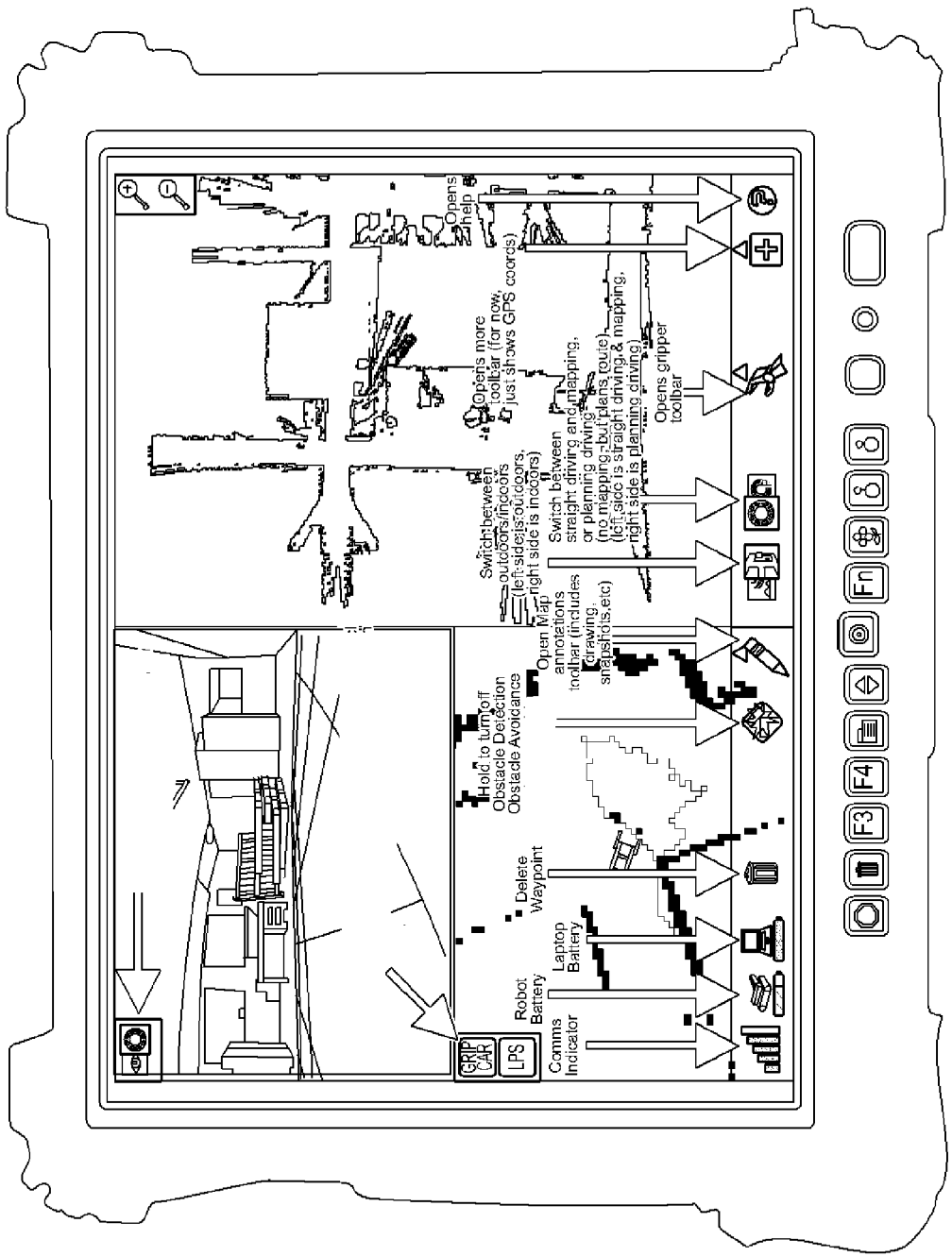
FIG. 5 illustrates an exemplary embodiment of a user interface of the present teachings.

FIG. 5 illustrates an exemplary embodiment of a user interface of the present teachings. The user interface can be displayed, for example, on an operator control unit (OCU) such as a ruggedized laptop or a similar device. The illustrated exemplary interface includes a video feed (e.g., a drive camera video feed) in an upper left quadrant of the screen, a local perceptual space (LPS) image in a lower left quadrant of the screen that represents sensed obstacles in the remote vehicle's immediate vicinity, and a map view that can include an icon showing the location and orientation (obscured by writing in FIG. 5) of the remote vehicle on the map. A similar icon can be used in the LPS image. The map can also include a dashed line indicating the remote vehicle's intended path (not visible in FIG. 5). Zoom icons are provided in an upper right corner of the map view, and can allow the user to zoom in and out of the map view. The map view can also include annotations or markers placed thereon by the user as describe in more detail below. A "home" icon can be placed in the map by default and/or user placement/repositioning and indicates a position to which the remote vehicle should return if, for example, communication with the OCU is lost. In various embodiments, a user can click on the home icon to cause the remote vehicle to switch to a planning mode and traverse a planned path back to home.

A tool bar can be provided along one or more of a top, side, and bottom of the screen. The illustrated toolbar includes a communication signal strength indicator, a remote vehicle battery charge level indicator, an OCU battery charge level indicator, a trash can to which items such as waypoints can be dragged for deletion, an icon that can be pressed continuously to temporarily override obstacle detection/obstacle avoidance, an icon that can clicked on to open a map annotation toolbar (including, for example, a drawing tool, a snapshot tool, and markers (e.g., IED markers) to be placed on the map). In accordance with certain various embodiments of the present teachings, pressing on a screen icon with a stylus or using a mouse to click and hold on an icon can turn off the obstacle detection/obstacle avoidance behavior while the icon is held down (i.e., until the icon is released), and can additionally cause the remote vehicle to reduce its speed.

The toolbar can also include an icon allowing the operator to switch between outdoor and indoor operation, an icon allowing the user to switch between just driving the remote vehicle, mapping while driving, and planned driving (i.e., no mapping, but the remote vehicle plans a route to a designated waypoint), an icon that opens a gripper toolbar, an icon that opens yet another toolbar (e.g., to display GPS coordinates), and a Help icon. Within the LPS image, at the upper left corner, are two buttons that allow a user to toggle between an LPS image (bottom button) and a gripper camera video feed (top button) in this area of the screen. Within the video feed image, in the upper left corner, is a toggle button that allows the user to switch between click-to-look and click-to-drive. Click-to-look and click-to-drive can alternatively be accomplished by clicking on the video feed (to look at the designated point) or clicking and holding on the video feed (to drive to the designated point).

Figure 6:
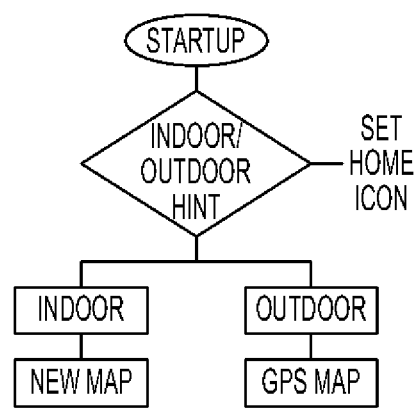
FIG. 6 is a flow chart illustrating how the exemplary user interface embodiment of FIG. 5 can be utilized to make control of a remote vehicle simpler and more intuitive.
Figure 7A:
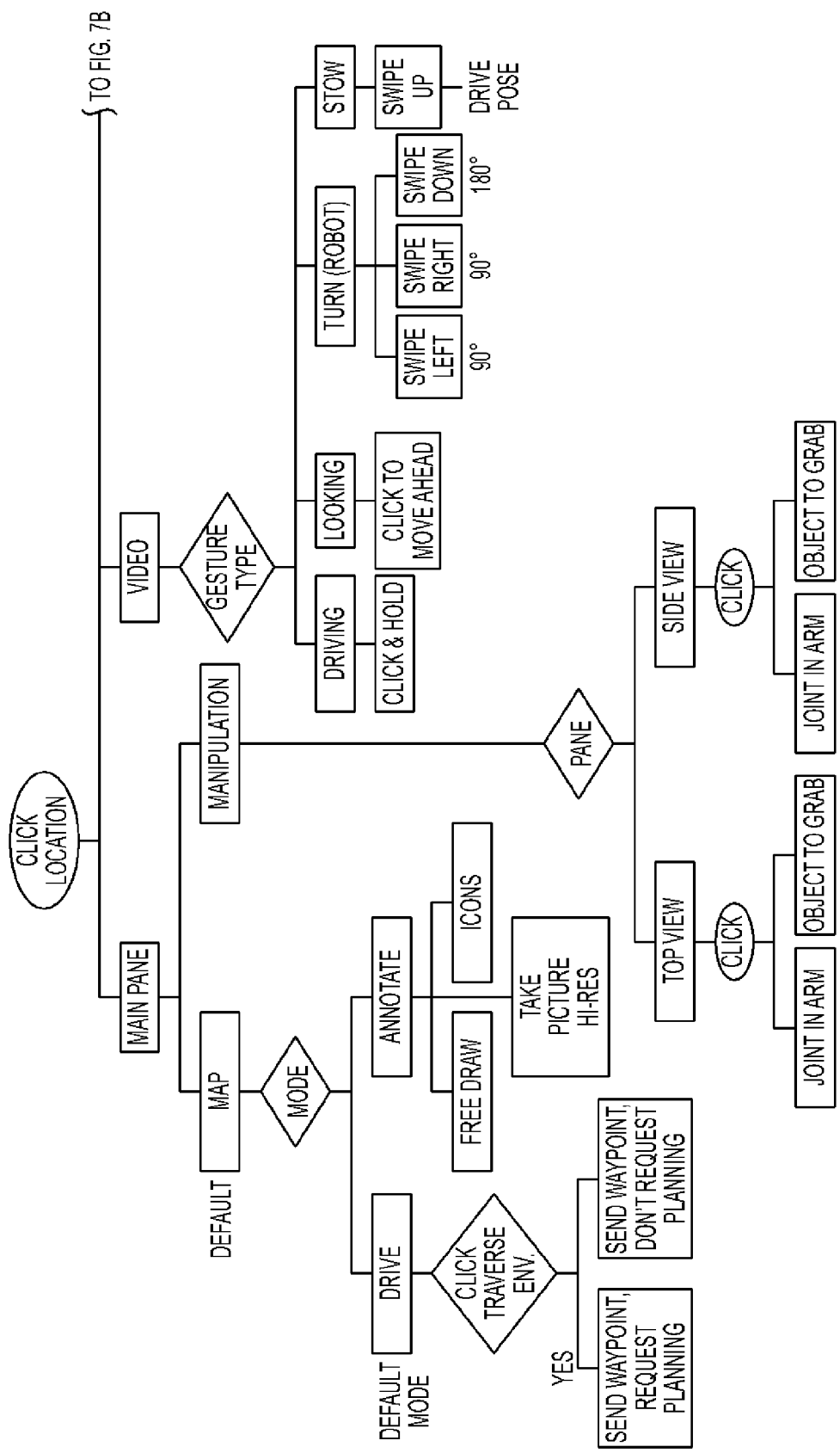
FIG. 7A is another flow chart illustrating how the exemplary user interface embodiment of FIG. 5 can be utilized to make control of a remote vehicle simpler and more intuitive.
Figure 7B:
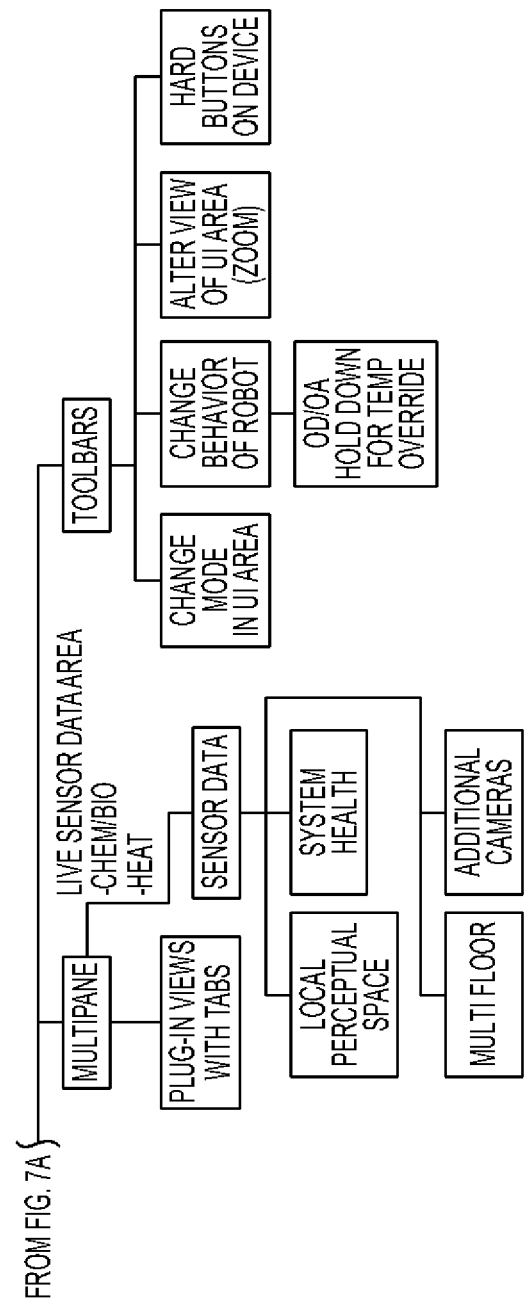
FIG. 7B is another flow chart illustrating how the exemplary user interface embodiment of FIG. 5 can be utilized to make control of a remote vehicle simpler and more intuitive.

FIGS. 6, 7A, and 7B are flowcharts illustrating how the exemplary user interface embodiment of FIG. 5 can be utilized to make control of a remote vehicle simpler and more intuitive. As can be seen in FIG. 6, upon startup, the system determines whether it is indoors or outdoors. This can be done by user designation on the OCU screen (e.g., clicking on an appropriate icon), or by analyzing appropriate sensor input. If the remote vehicle is indoors, a new map generation can begin. If the remote vehicle is outdoors, GPS tracking begins. Thereafter, the OCU screen receives and displays information from the remote vehicle to the user, such as a live video feed from a drive camera, an LPS image, and a map view (to be updated as the remote vehicle traverse its environment and maps it. The user can control the remote vehicle by interacting with the OCU screen in a number of ways and in each of the areas of the screen.

FIGS. 7A and 7B provide flowcharts illustrating an exemplary embodiment of user interaction possibilities for each area of the screen. As shown in the figures, possible click locations include the main pane (FIG. 7A), a video pane (FIG.

7A), a multi-pane (FIG. 7B), and a toolbar (FIG. 7B). On a main pane (FIG. 7A), which in the embodiment of FIG. 5 is the right side of the screen, a user can select between a top-down map view as shown, and a manipulator view (not shown in FIG. 5). If the top-down map view is selected, the system determines the mode of the OCU. The mode can be either Drive or Annotate, depending on the user's actions. As the remote vehicle is driven through its environment, clicks on the top-down map view can create a waypoint and cause the remote vehicle to traverse the environment toward the waypoint. However, planning need not be requested for waypoint driving. In certain embodiments of the present teachings, the main pane defaults to a top-down map view in a drive mode. If annotate mode is selected from the top-down map view instead of a drive mode, the user can either free draw (e.g., by clicking on the pencil icon of the tool bar), select icons to place on the map (e.g., an IED icon) and then click where the icon should be placed on the map, or take a picture (e.g., a high-resolution picture) of an object of interest.

If manipulation view is selected from the main pane, rather than map, a top view and a side view of the manipulator arm can be displayed, and the user can click in either of the views to select an object to grip. An object can be selected for gripping in either of the top and side views by first clicking on the manipulator arm or the gripper and then clicking on the object to be gripped.

On a video feed portion of the screen, for example on a drive camera video feed display, the user can perform a number of gesture types to control the remote vehicle. For example, to drive the remote vehicle to a location in the video feed display, the user can click and hold the pen on the location. To look at an object or a portion of the video feed display, the user can click on the object or area to be viewed, which can move the robot head to look. Thus, a user can click once to view an area and click and holds to move the remote vehicle there. To turn the remote vehicle, the user can, within the video feed display, swipe left, swipe right, or swipe down. Swiping left can, for example, cause the remote vehicle to turn 90° to the left. Swiping right can, for example, cause the remote vehicle to turn 90° to the right. Swiping down can, for example, cause the remote vehicle to turn 180°. To stow the vehicle, swiping up can, for example, cause the remote vehicle to assume a drive pose. Swiping can be used additionally or alternatively to cause the remote vehicle to perform other common functions.

To rotate the remote vehicle, the present teachings contemplate collecting events and then doing a least median of squares (LMS) fit. A limit of five strobes can be implemented due to the difficulty of the environments. The remote vehicle can first look in the direction it will turn to check for obstacles, and then perform an integrated, adaptive, interruptible turn (meaning that it may move forward or backward before, during, and/or after the turn to avoid an obstacle.

In a multi-pane view such as the OCU screen view illustrated in FIG. 5, plug-in views can be used. One pane includes a top-down map view, another pane can include a video feed from, for example, a drive camera, and yet another pane can include a local perceptual space (LPS) image. Other sensor data can also be represented on a multi-pane view, including a system status/health display, a multi-floor map such as that shown in FIG. 2, or an additional video feed (e.g., a gripper camera video feed.

One or more toolbars can also be displayed on the OCU screen. The present teachings contemplate embodiments wherein the toolbars can be hidden at the user's request. The toolbars can comprise icons or menus allowing a user to, for example, change a mode (e.g., drive or annotate a map view), change a remote vehicle behavior (e.g., a temporary obstacle detection/obstacle avoidance override by pressing and holding an icon), and alter a view of the user interface area by, for example, zooming in or out. In addition to a graphical toolbar displayed on the OCU screen, the present teachings contemplate utilizing hard button on the OCU to implement certain desired functionality. In certain embodiments of the present teachings, system status/health display, when selected, can replace the LPS view or the gripper video feed in the lower right quadrant of the screen so that the user can continue to drive the remote vehicle via the drive video feed and the top-down map view. In accordance with certain embodiments of the present teachings, the user can drive the remote vehicle by interacting with the LPS portion of a multi-pane view, for example by clicking in the LPS portion at a desired location or dragging a stylus or cursor along a desired path. Further, in various embodiments, the user can drag the stylus or cursor within the top-down map view to move or scroll the map view. For example, a user can click in the middle of the top-down map view and drag the cursor downward to scroll the map view downward and bring addition area into the top of the map view. This allows the user to scroll to different areas of a map as needed.

Figure 8:
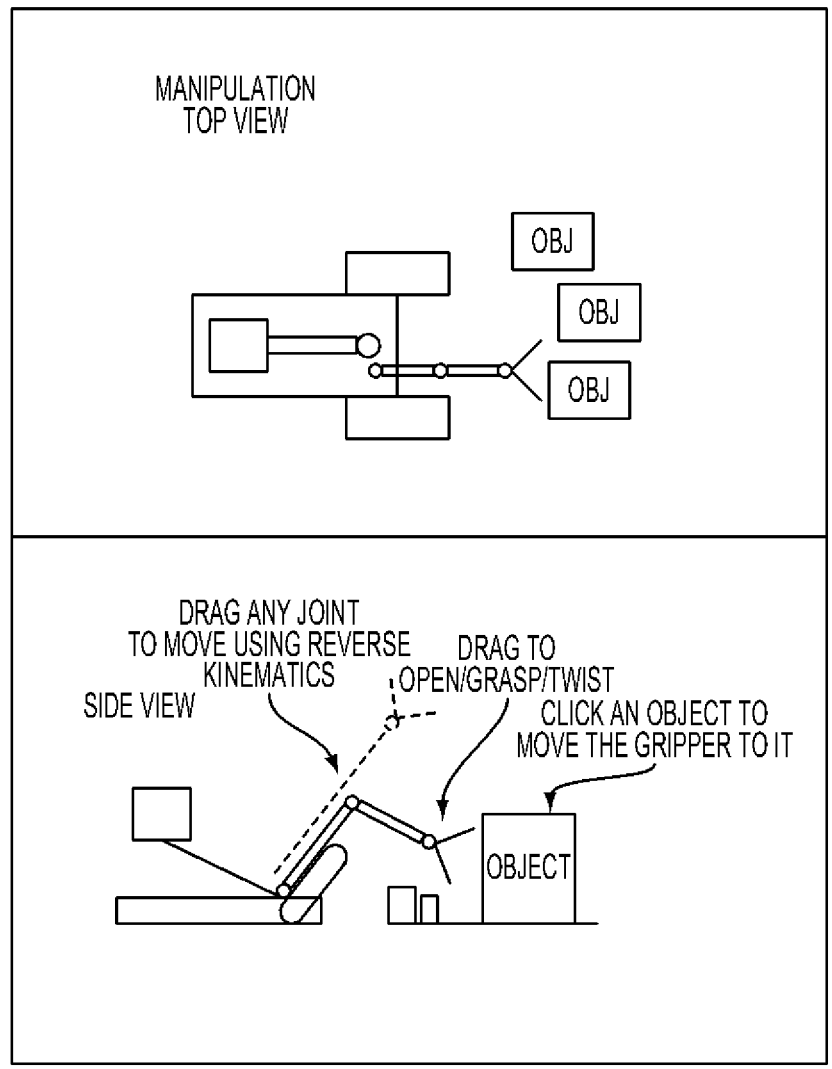
FIG. 8 illustrates an exemplary embodiment of a manipulation view that can be selected for the main pane of the OCU screen.

FIG. 8 illustrates an embodiment of a manipulation view that can be selected for the main pane of the OCU screen. The manipulation view can display a top view of the remote vehicle including the manipulator arm (in a top portion of the pane) and a side view of the remote vehicle including the manipulator arm (in a bottom portion of the pane). A user can click in either of the views to select an object to grip. An object can be selected for gripping in either of the top and side views by first clicking on the manipulator arm or the gripper and then clicking on the object to be gripped.

Figure 9:
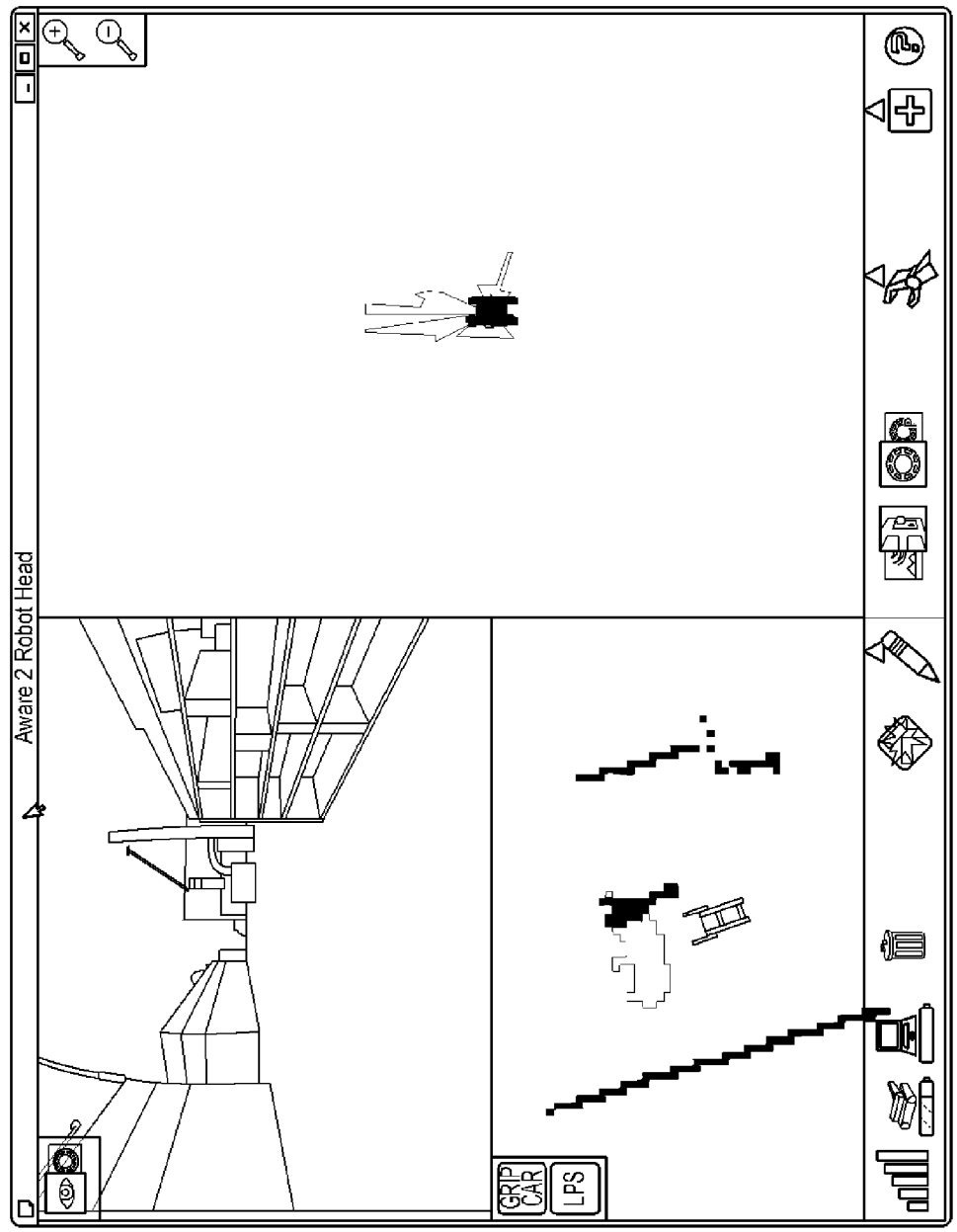
FIG. 9 is a screen shot of an exemplary multi-paned user interface in accordance with various aspects of the present teachings.
Figure 10:
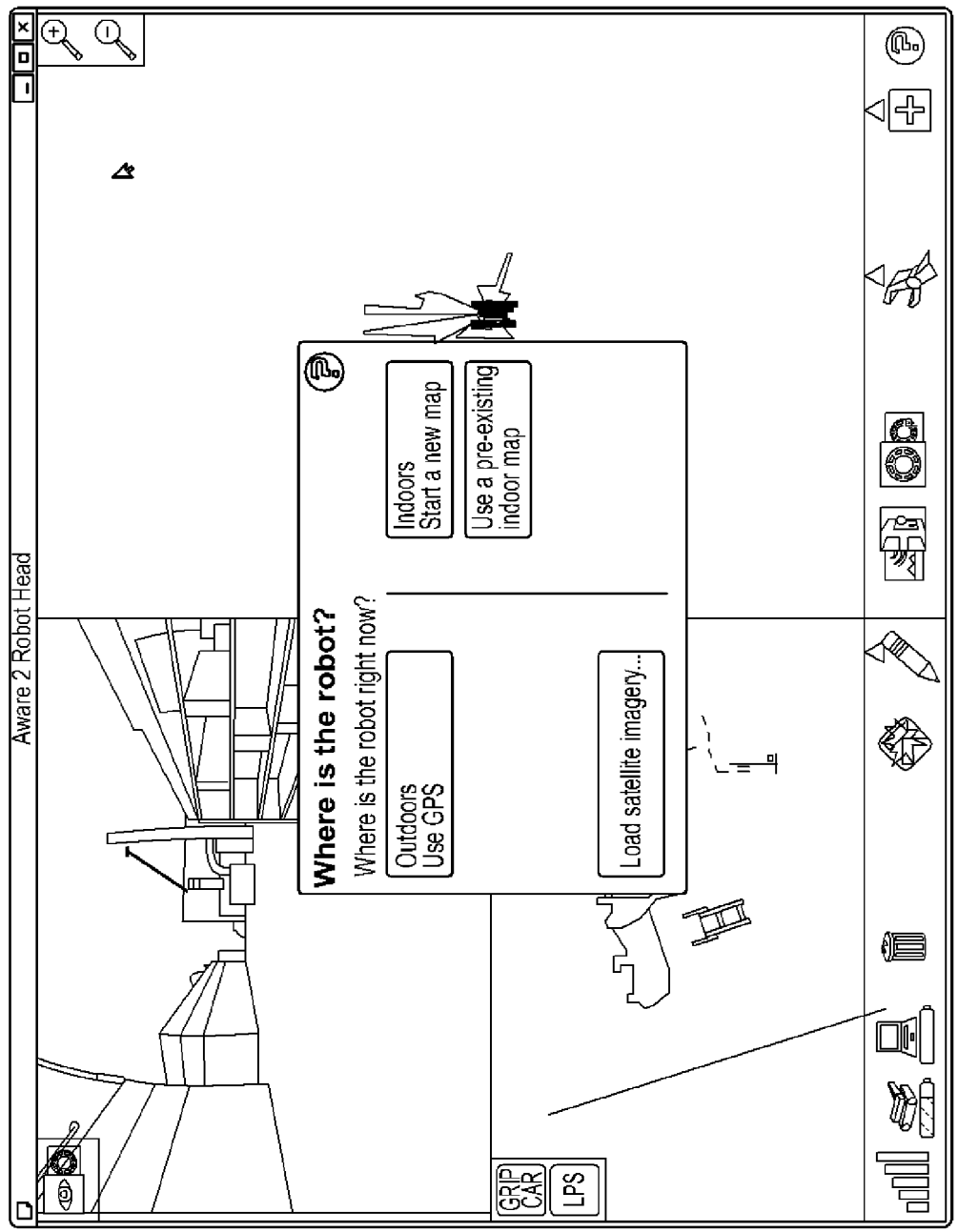
FIG. 10 is a screen shot of an exemplary user interface showing a window prompting the user to designate whether the remote vehicle is indoors or outdoors and, if indoors, whether the remote vehicle should begin mapping or use an existing map.

FIG. 9 is a screen shot of an exemplary multi-paned user interface in accordance with various aspects of the present teachings, wherein the right side of the screen provides a top-down map view and the remote vehicle is beginning to map an indoor environment. FIG. 10 is a screen shot of an exemplary user interface showing a window (displayed, for example, at startup) prompting the user to designate whether the remote vehicle is indoors or outdoors and, if indoors, whether the remote vehicle should begin mapping or use an existing map. The user can be prompted to select among indoor maps when appropriate.

Figure 11:
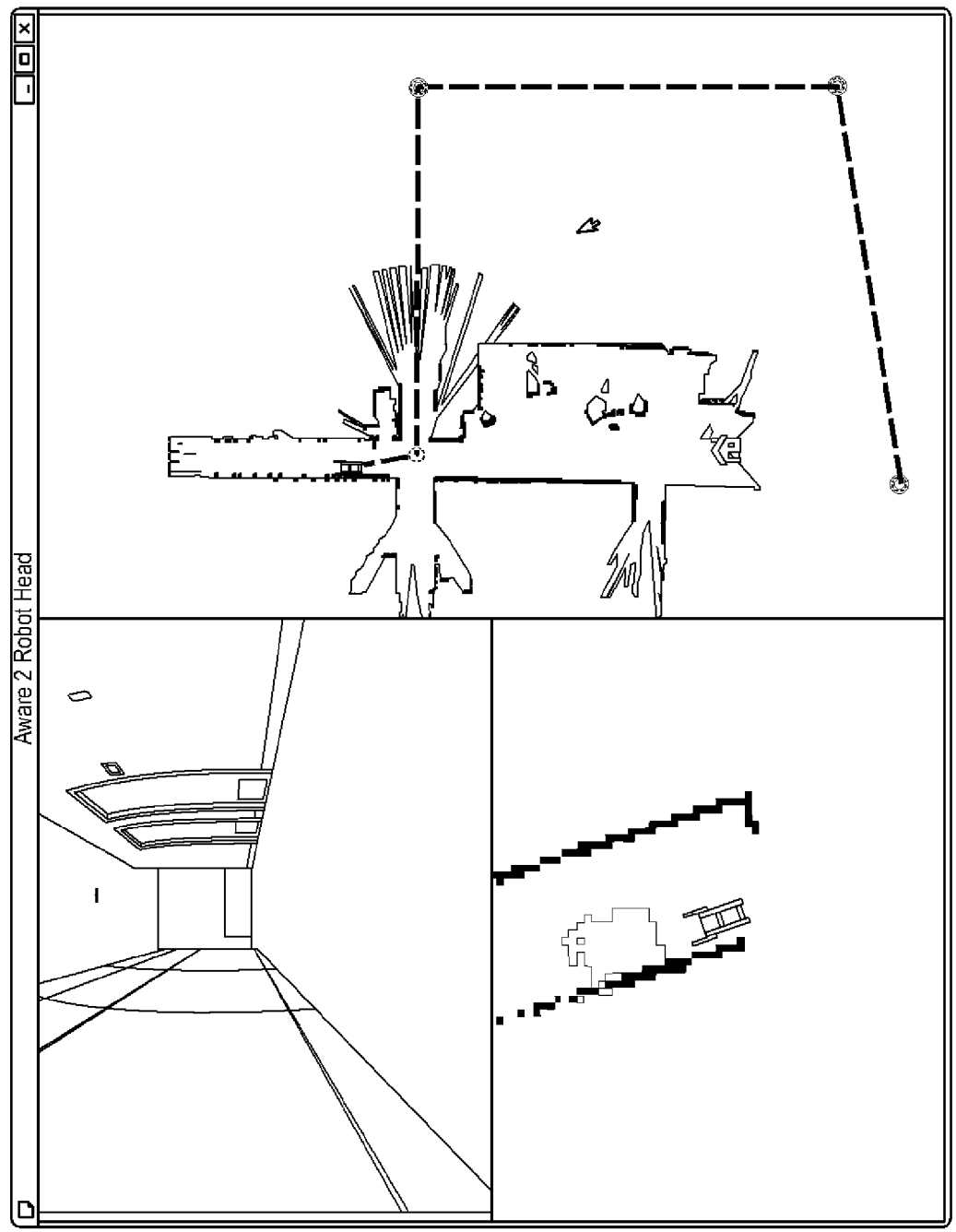
FIG. 11 is a screen shot of an exemplary multi-paned user interface wherein the right side of the screen provides a top-down map view and the remote vehicle has mapped a portion of its environment and has been directed by user waypoint selection to map an additional unknown area of its environment.
Figure 12:
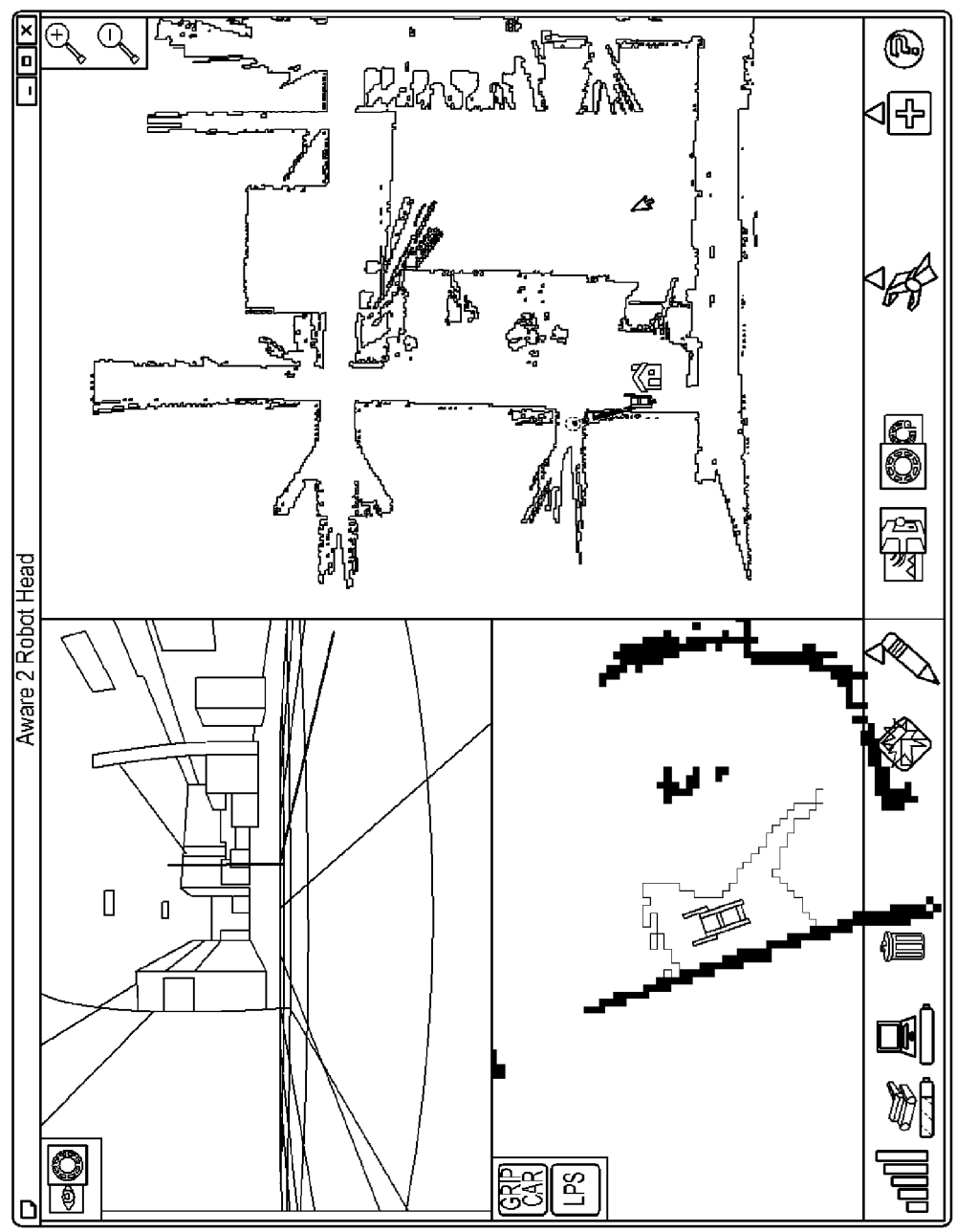
FIG. 12 shows a screen shot after the remote vehicle has explored a previously-unknown area of FIG. 11 in accordance in accordance with a user waypoint selection.

FIG. 11 is a screen shot of an exemplary multi-paned user interface wherein the right side of the screen provides a top-down map view and the remote vehicle has mapped a portion of its environment and has been directed by user waypoint selection to map an additional unknown area of its environment. In this screen shot, the toolbar has been hidden. FIG. 12 shows a screen shot after the remote vehicle has explored the previously-unknown area in accordance with the user waypoint selection.

Figure 13:
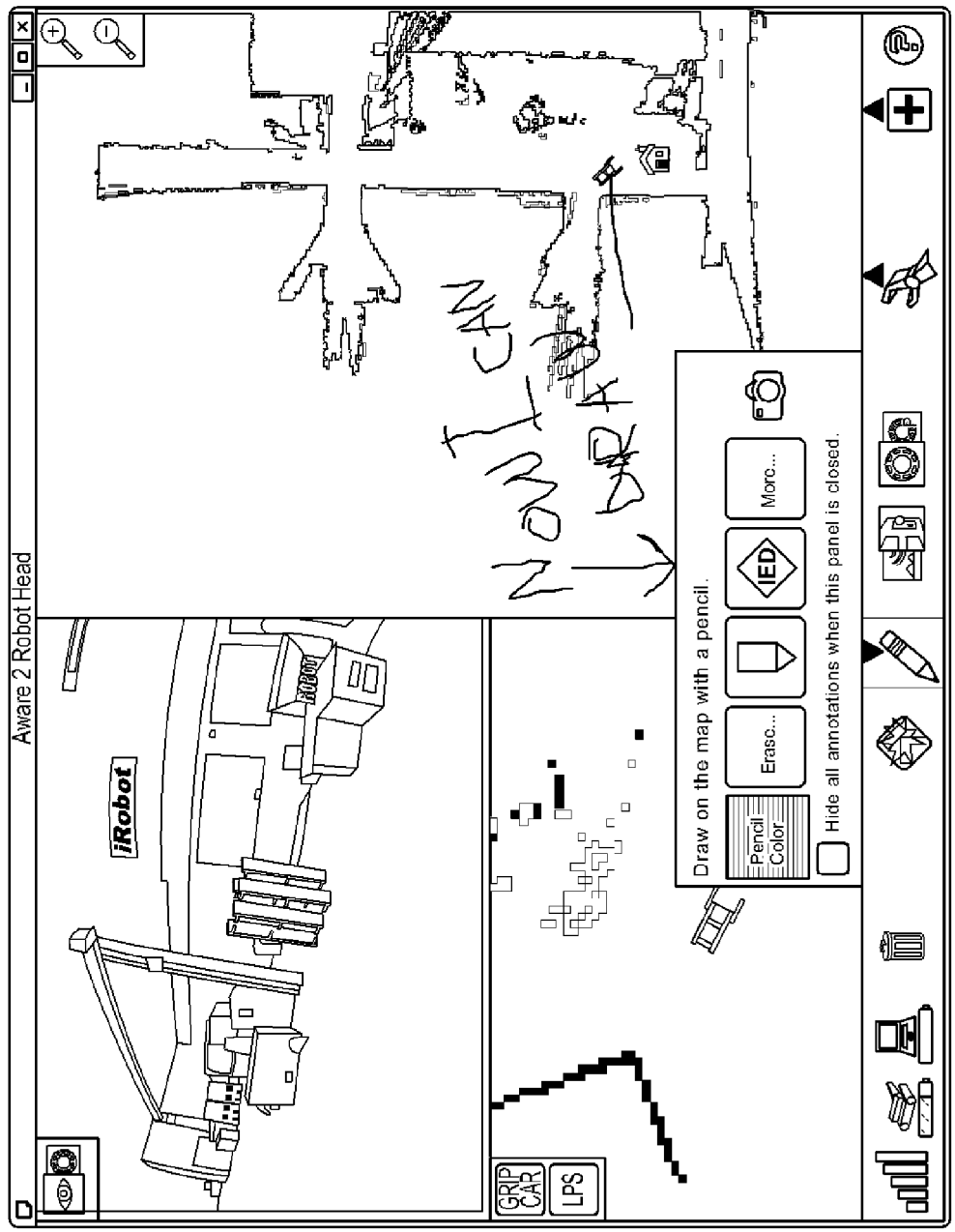
FIG. 13 illustrates an exemplary embodiment of an annotation toolbar accessed by the user by clicking on the pencil icon in the main toolbar that runs along the bottom of the screen unless hidden. The user has clicked on the pencil icon and annotated the map.
Figure 14:
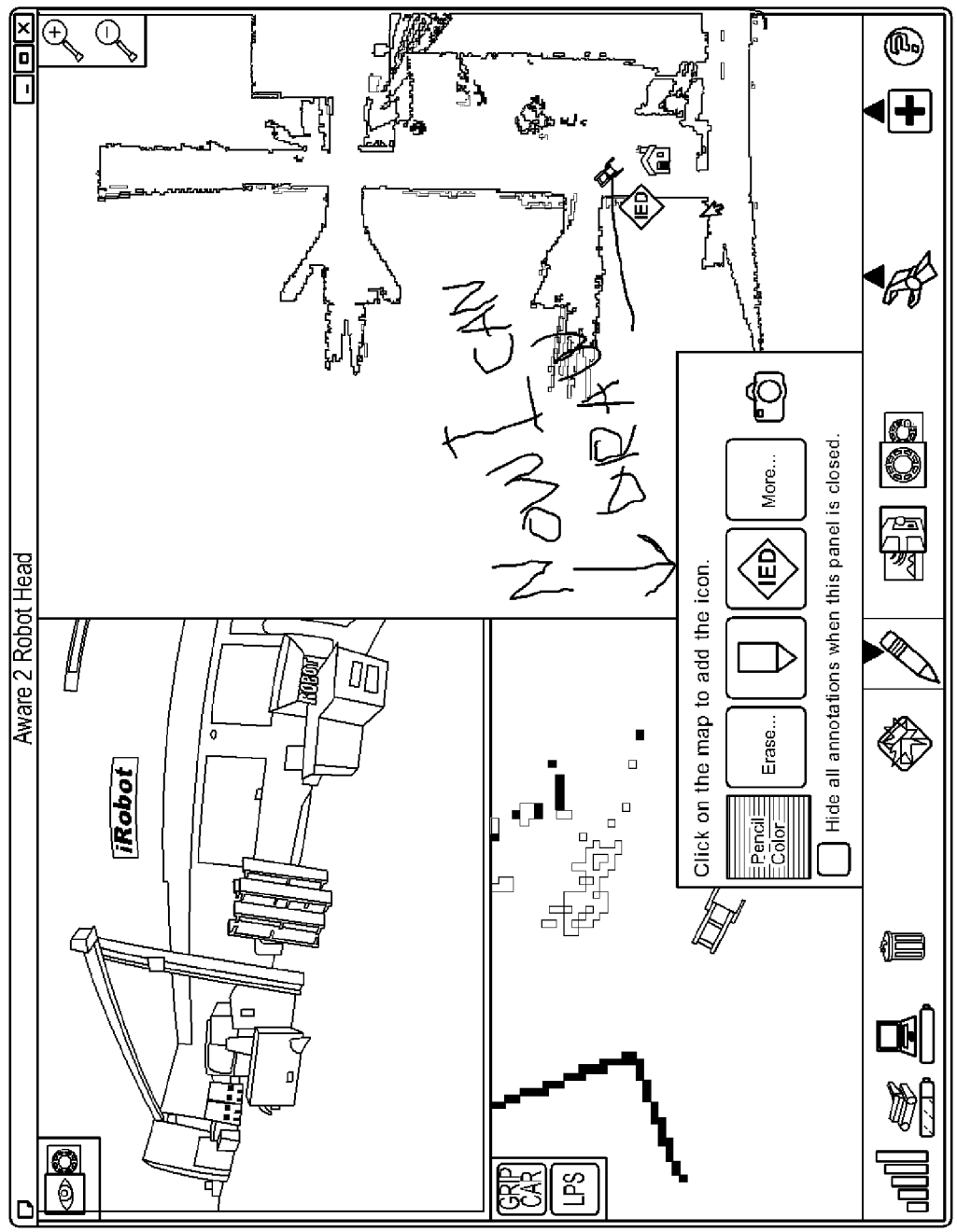
FIG. 14 illustrates an exemplary embodiment of an annotation toolbar accessed by the user by clicking on the pencil icon in the main toolbar that runs along the bottom of the screen unless hidden. The user has placed an IED marker on the map, indicating (for example to the user and/or to a command center) a location of a possible IED.

FIG. 13 illustrates an exemplary embodiment of an annotation toolbar accessed by the user by clicking on the pencil icon in the main toolbar that runs along the bottom of the screen unless hidden. The annotation toolbar includes a button selecting a color with which to draw on the map (labeled "Pencil Color"), a button to erase what was drawn on the map, a button the turn the user's touch pen into a pencil so that the user can draw on the map, a button to select an IED marker for placement on the map, a button to bring up more annotation choices, and a button (shaped as a camera) to cause the remote vehicle to take a picture (e.g., a high-res picture) representing what the remote vehicle is currently seeing. A representation of the high-res picture and a link thereto can be provided on the top-down map view. The present teachings contemplate providing additional markers for placement on the map view. In FIG. 14, an IED marker has been placed on the map, indicating (for example to the user and/or to a command center) a location of a possible IED.

Figure 15:
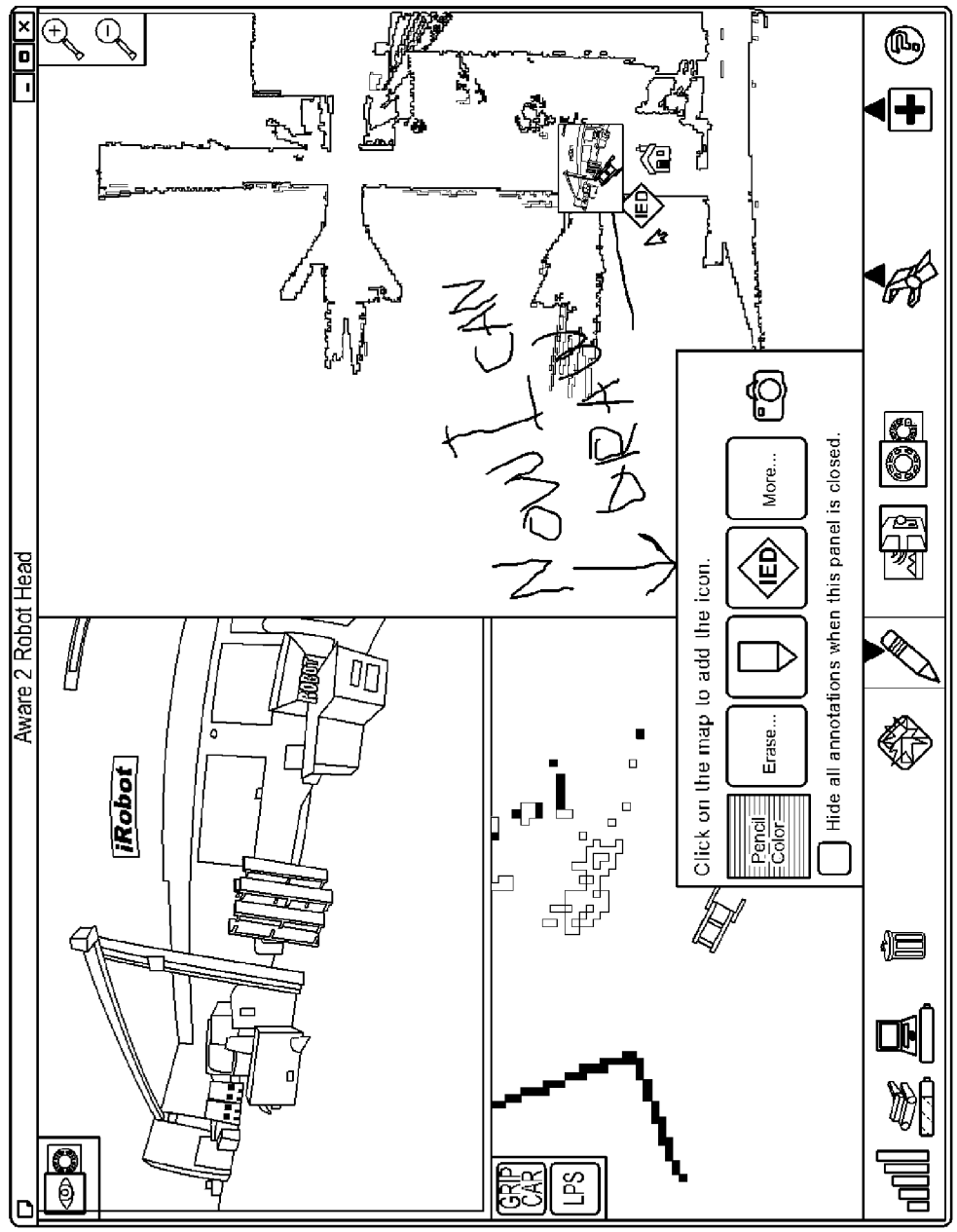
FIG. 15 illustrates an exemplary embodiment of an annotation toolbar accessed by the user by clicking on the pencil icon in the main toolbar that runs along the bottom of the screen unless hidden. The user has taken a photo and the photo has been properly located on the map.
Figure 16:
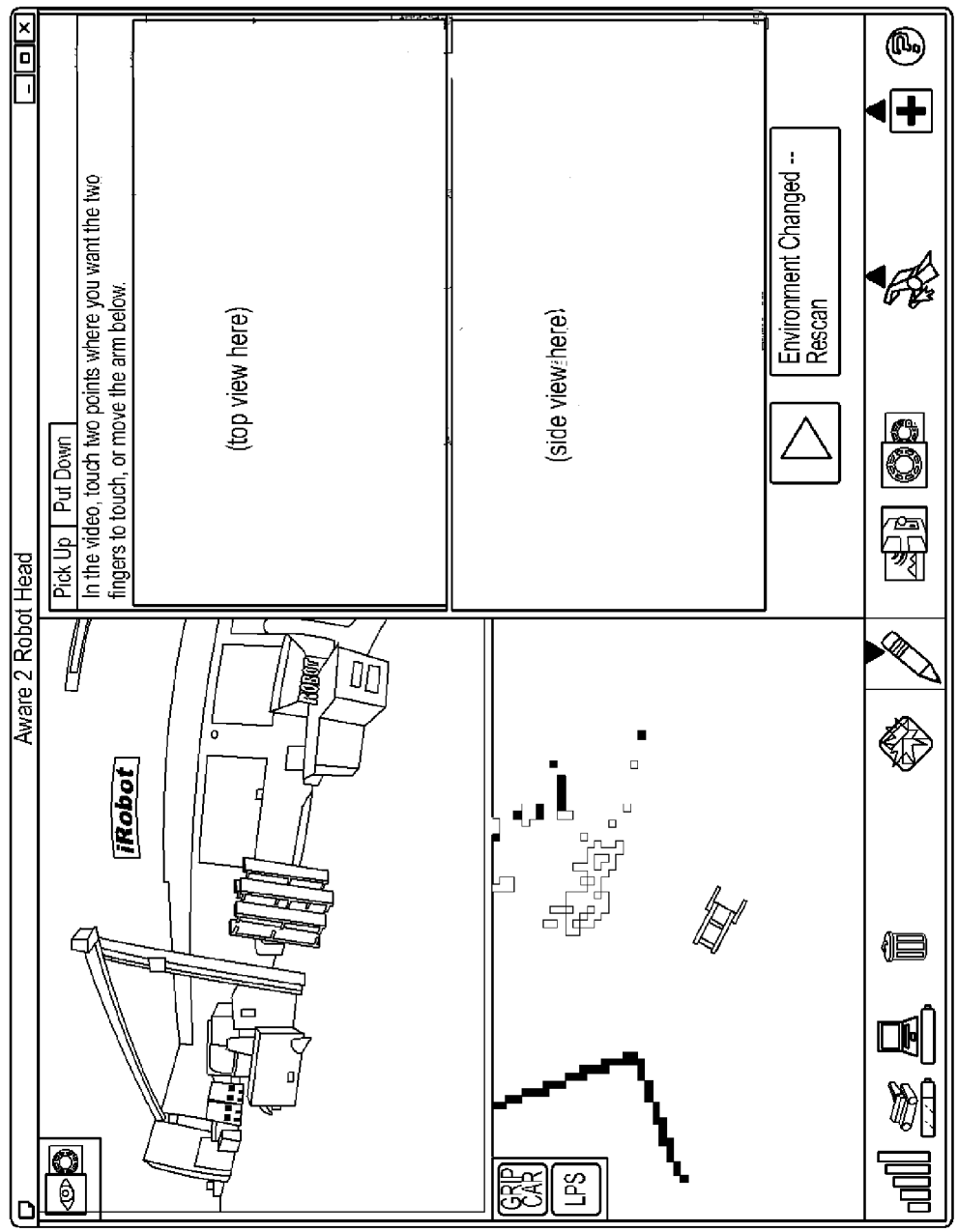
FIG. 16 is screen shot of an exemplary embodiment of a multi-paned user interface wherein the right side of the screen provides a manipulation view. The top view and side view are not provided—only the bounds for the views.

FIG. 15 illustrates placement of a high-res picture representation on the top-down map view after the annotation toolbar is used to take a picture. FIG. 16 is screen shot of an exemplary embodiment of a multi-paned user interface wherein the right side of the screen provides a manipulation view. The top view and side view are not provided—only the bounds for the views. The actual views would look similar to the exemplary top and side views shown schematically in FIG. 8.

Figure 17C:
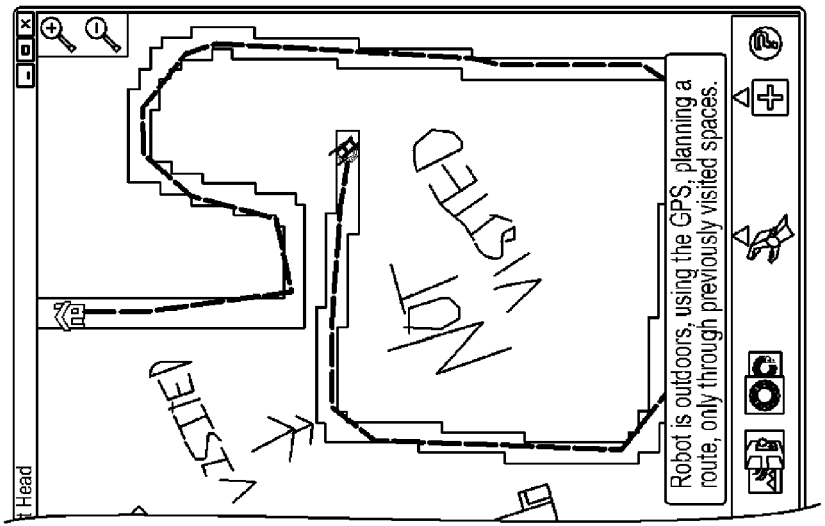
FIGS. 17A-17C illustrate a "fog of war" view that can be displayed in the top-down map view portion of the screen during outdoor remote vehicle driving and mapping.
Figure 17B:
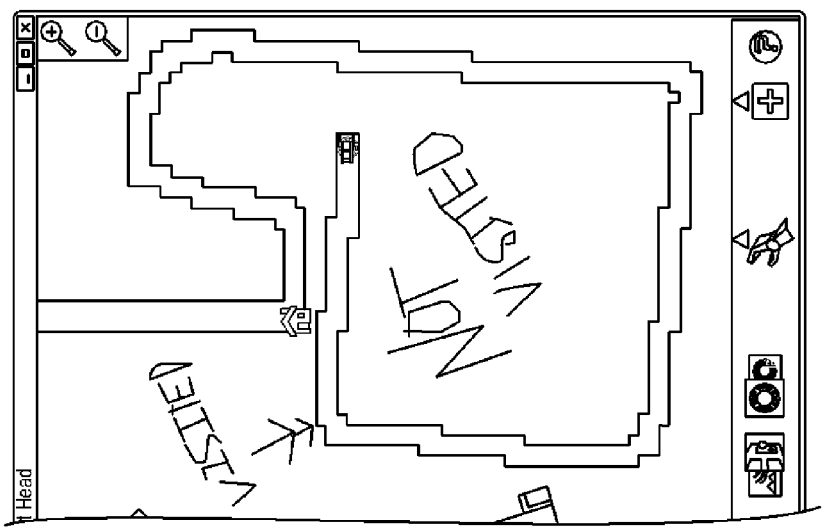
Figure 17A:
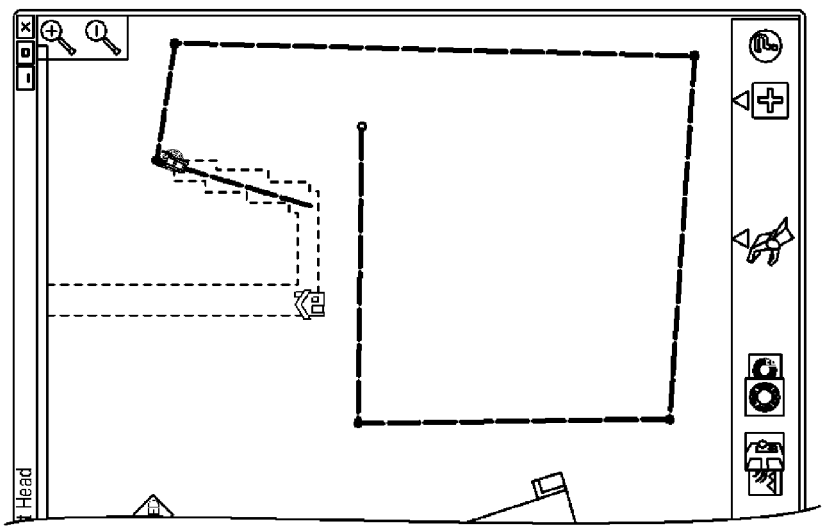

FIGS. 17A-17C illustrate a "fog of war" view that can be displayed in the top-down map view portion of the screen during outdoor remote vehicle driving and mapping. As the remote vehicle explores the outdoor environment, an overlay (i.e., a gray "fog") is removed to indicate that the remote vehicle has traversed and mapped that portion of the environment. In FIG. 17A, the remote vehicle has traversed a portion of the outdoor environment and has been given waypoints in an unknown area to cause exploration of the unknown area. In FIG. 17B, the remote vehicle has traverse the waypoints. IN FIG. 17C, the user has clicked on the home icon and the remote vehicle has planned a path back to home via a previously-traversed path within the environment.

Figure 18:
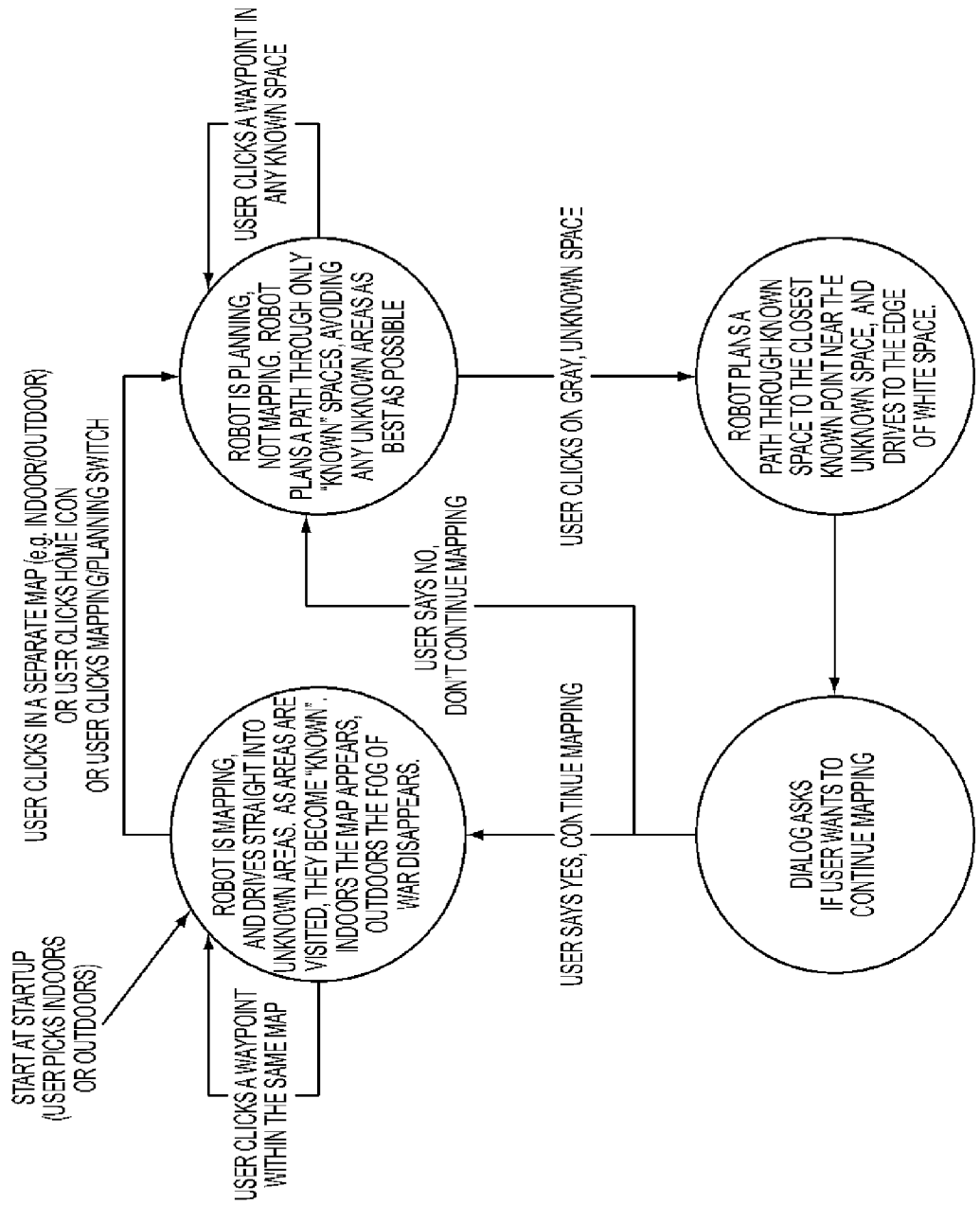
FIG. 18 is a flow chart illustrating an exemplary embodiment of a fog-or-war process.

FIG. 18 is a flow chart illustrating an exemplary embodiment of a fog-or-war process. As shown, upon startup, the remote vehicle begins mapping by driving into unknown areas that can be represented by an overlay such as a gray-colored overlay as shown in FIG. 9 for indoor mapping and FIGS. 17A-17C for outdoor mapping. The gray overlay in outdoor mapping can be referred to as "fog-of-war." As areas are traversed by the remote vehicle, the areas become "known." If the remote vehicle is indoors, a map appears of the traversed "known" areas. If the remote vehicle is outdoors, the fog-of-war disappears over the traversed areas. A user can click a waypoint within an unknown area of the map to continue the remote vehicle's exploration of the unknown area. In accordance with certain embodiments, to cease exploration, a user can click in a map of another environment (e.g., indoor/outdoor), click on the home icon, or click the icon to toggle between mapping and planning functions. Thereafter, the remote vehicle begins planning and plans a path through only known spaces of its environment, avoiding unknown areas as best possible. During planning, a user can click a waypoint in any known space of the environment to cause the remote vehicle to drive there.

If, during planning, the user clicks on a gray (unknown) portion of the environment to designate a waypoint, the remote resumes planning and plans a path through known space to a closest known point to the waypoint, drives to the edge of the known space, and begins exploring the unknown space to reach the waypoint. In various embodiments, once the remote vehicle reaches the edge of the unknown space, a dialog box can open to ask the user if he or she wants to continue mapping. If the user says yes, the remote vehicle starts at mapping an unknown area again. If the user says no, the robot switches to a planning mode. In accordance with certain embodiments of the present teachings, the user can click on a waypoint and move it within the environment by dragging it around the screen, causing the remote vehicle will adjust its course to the new waypoint.

Figure 19A:
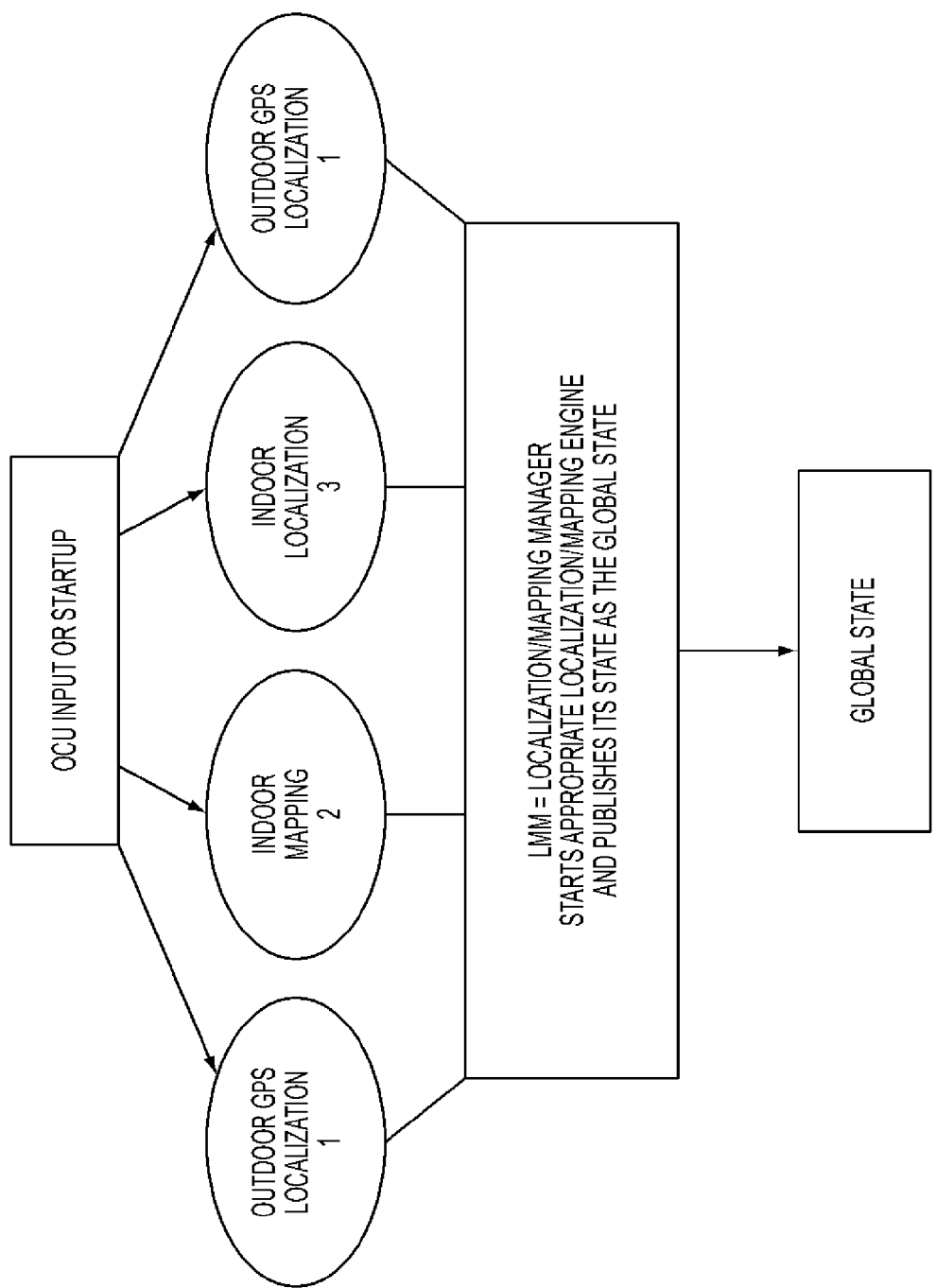
FIG. 19A is a schematic diagram illustrating an exemplary embodiment of a local state machine for a remote vehicle in accordance with the present teachings.
Figure 19B:
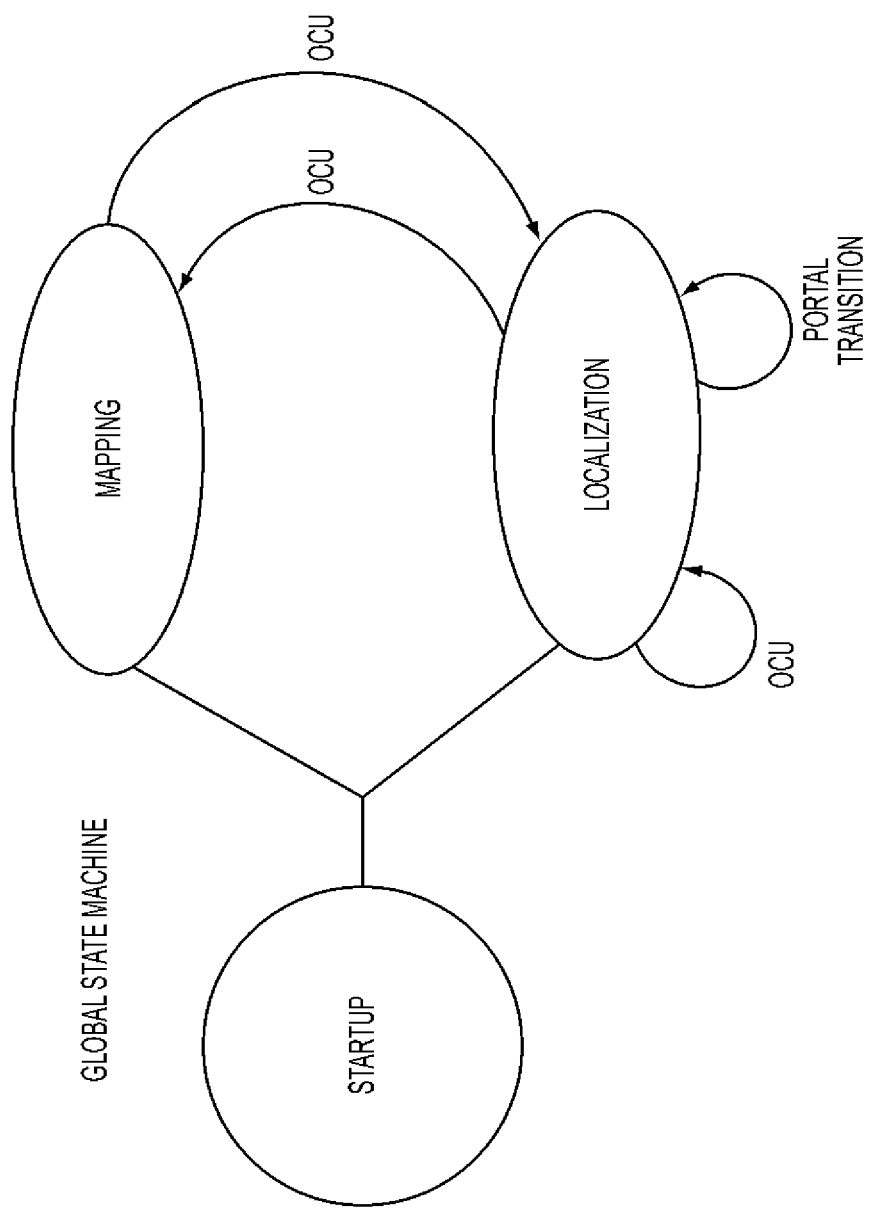
FIG. 19B schematically illustrates a global state machine and the interplay of localization and mapping.
Figure 19C:
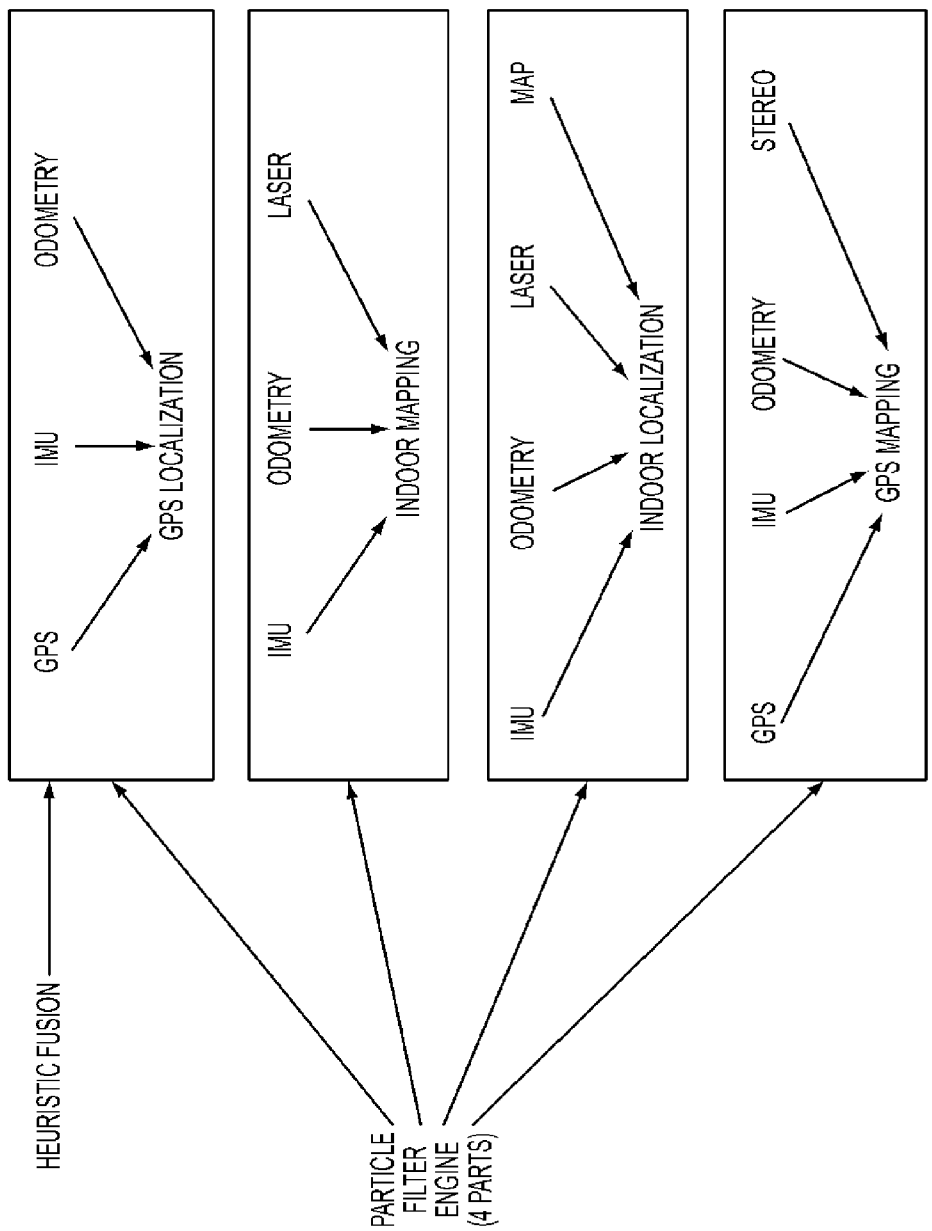
FIG. 19C illustrates exemplary embodiments of four particle filter engines that can be utilized in accordance with the present teachings.

FIG. 19A is a schematic diagram illustrating an exemplary embodiment of a local state machine for a remote vehicle in accordance with the present teachings. As shown, the remote vehicle can be mapping outdoors, mapping indoors, localizing indoors, or localizing outdoors. A localization/mapping manager can start the appropriate localization or mapping engine and publish its state as the global state. FIG. 19B schematically illustrates a global state machine and the interplay of localization and mapping. FIG. 19C illustrates exemplary embodiments of four particle filter engines utilized in accordance with the present teachings. GPS (outdoor) localization utilizes GPS, IMU, and odometry sensor inputs. Indoor mapping utilizes IMU, odometry, and laser range sensor inputs. Indoor localization utilizes GPS, IMU, and odometry sensor inputs in addition to mapping information. GPS (outdoor) mapping utilizes GPS, IMU, odometry, and stereo vision sensor inputs.

Figure 20:
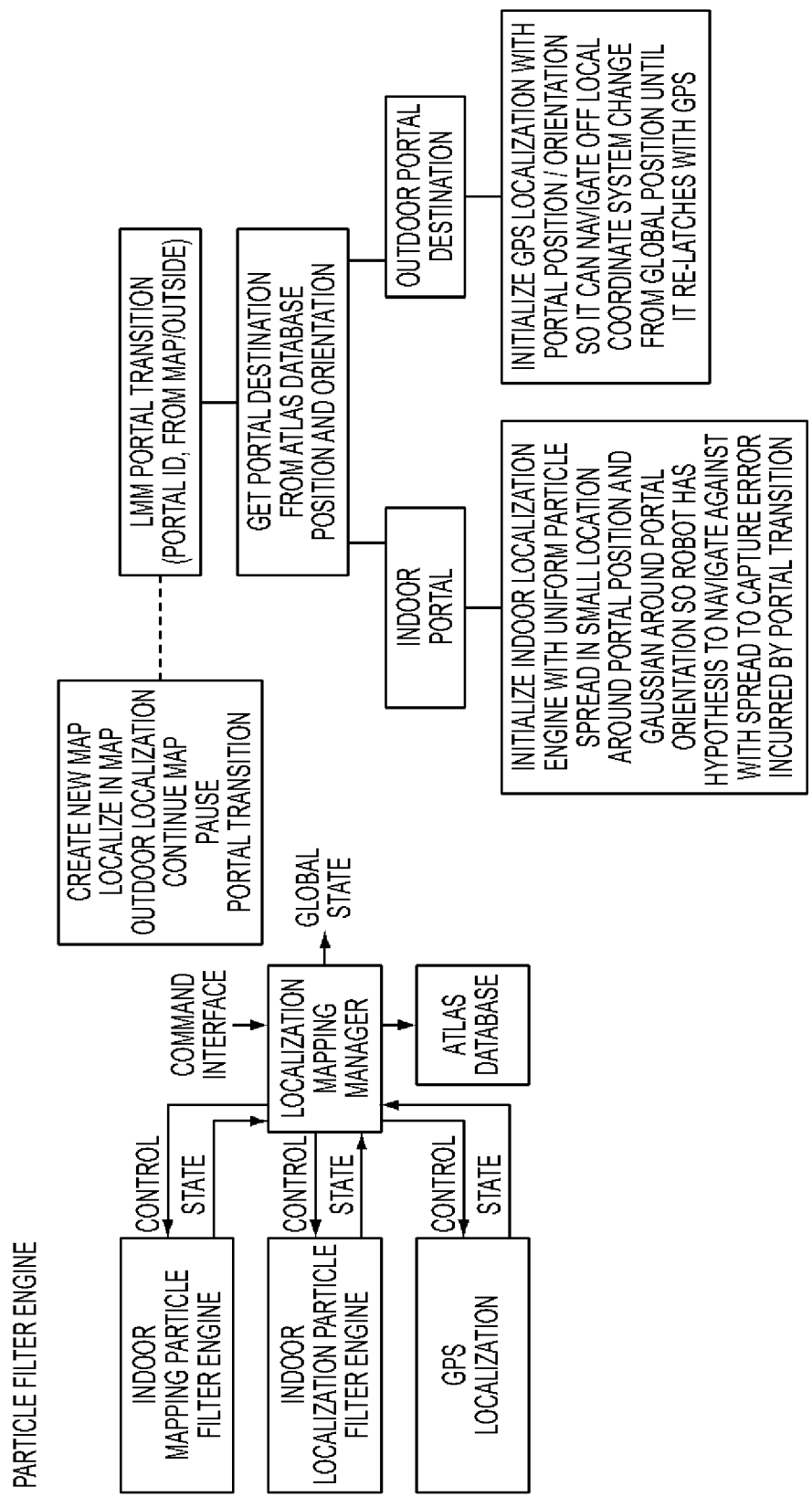
FIG. 20 is a flow chart illustrating various aspects of an exemplary particle filter engine, and the interaction with the localization/mapping manager of FIG. 19A.

FIG. 20 is a flow chart illustrating various aspects of an exemplary particle filter engine, and the interaction with the localization/mapping manager of FIG. 19A, which can access an Atlas database. As shown in FIG. 20, the localization/mapping manager can create a new map, localize in a map, localize outdoors, continue mapping, pause, and create a portal transition (e.g., at a stairway or between an outdoor and indoor environment). A flow chart explaining an exemplary embodiment of a portal transition is illustrated on the right side of FIG. 20. As shown, the localization mapping manager (LMM) Portal Transition has a portal ID and gets an associated portal destination from the Atlas database. If the portal is an indoor portal, the indoor localization engine is initialized as shown. If the portal is an outdoor portal, GPS localization is initialized as shown.

As shown in FIG. 20, control and state information is exchanged between the localization/mapping manager and an indoor mapping particle filter engine, an indoor localization particle filter engine, and a GPS localizer. The localization/mapping manager can access the illustrated Atlas database, receive command interface information and output global state information.

Figure 21:
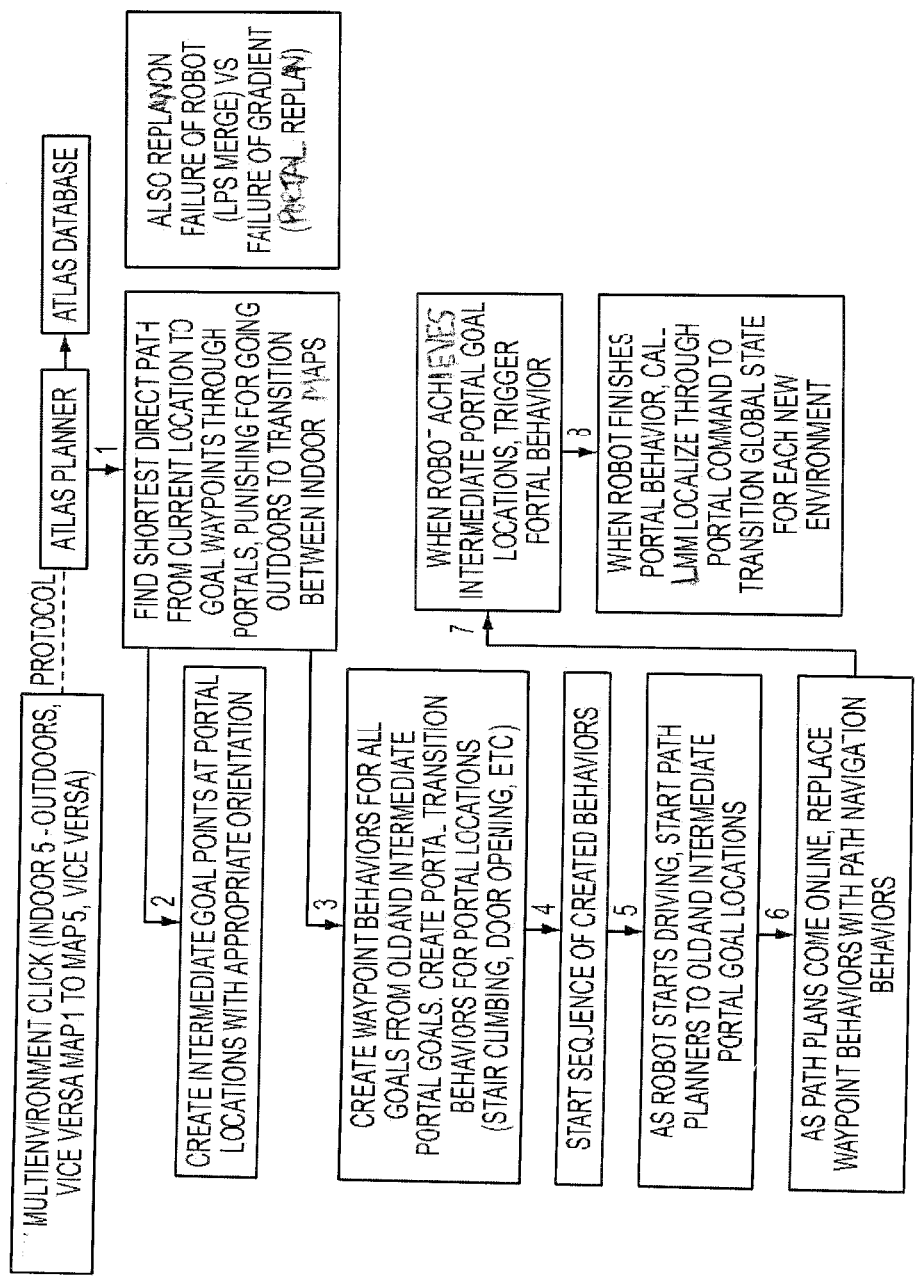
FIG. 21 is a flow chart illustrating an exemplary process undertaken upon a multi-environment click on the OCU screen.

FIG. 21 is a flow chart illustrating an exemplary process undertaken upon a multi-environment click on the OCU screen (e.g., outdoors to indoors, indoors to outdoors, from one map to another). An Atlas planner finds a shortest path from the remote vehicle's current location to the goal waypoints, creates intermediate goal points at portals, creates waypoint behaviors for all goals of the OCU and intermediate portal goals with an needed portal transition behaviors (e.g., stair climbing), starts a sequence of the created behaviors, stars path planner to OCU and intermediate goals locations as the remote vehicle begins driving, as path planning comes online, replaces waypoint behaviors with path navigation behaviors, triggers portal behaviors as portal goals are reached, calls LMM to localize when portal behavior finishes, which transitions the global state to another environment. Various embodiments of the present teachings contemplate replanning upon failure of the remote vehicle (e.g., an LPS error) of failure of the map.

Figure 22:
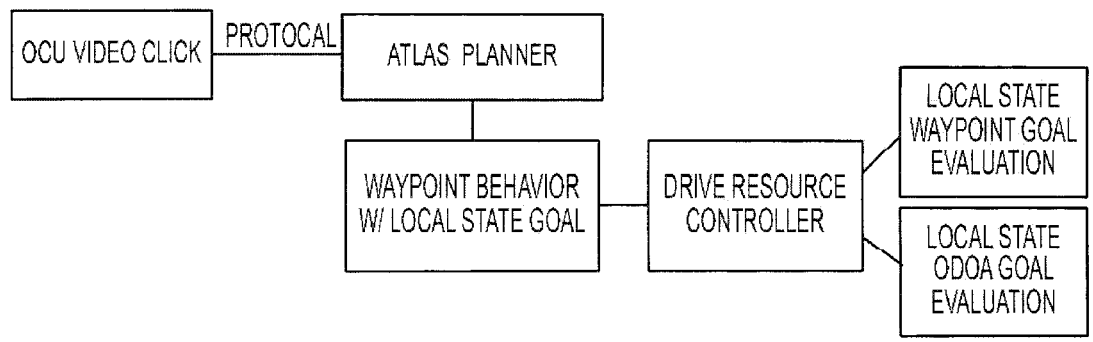
FIG. 22 is a flow diagram for an exemplary process that occurs when a user clicks in a video feed portion of an OCU screen.
Figure 23:
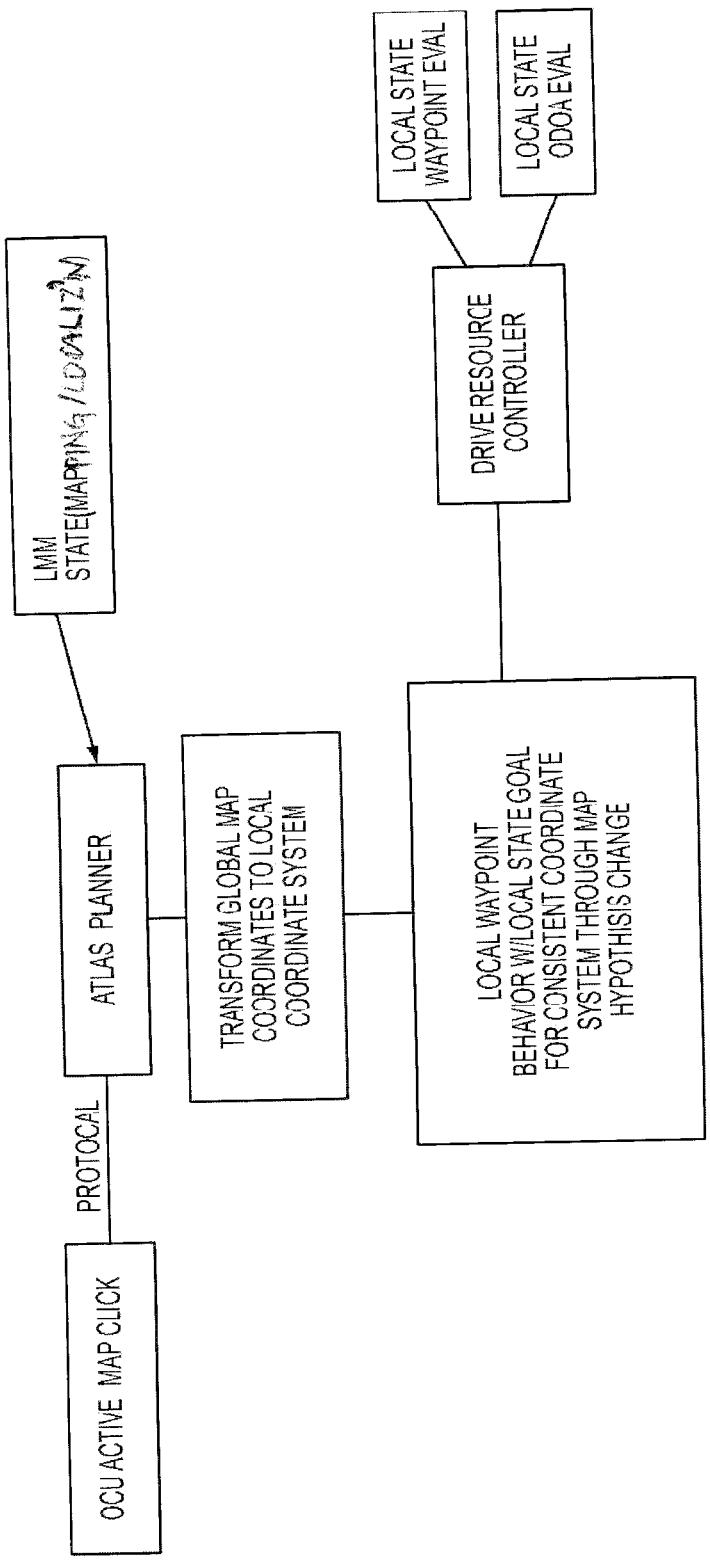
FIG. 23 is a flow diagram for an exemplary process that occurs when a user clicks in a top-down map view of an OCU screen.
Figure 24:
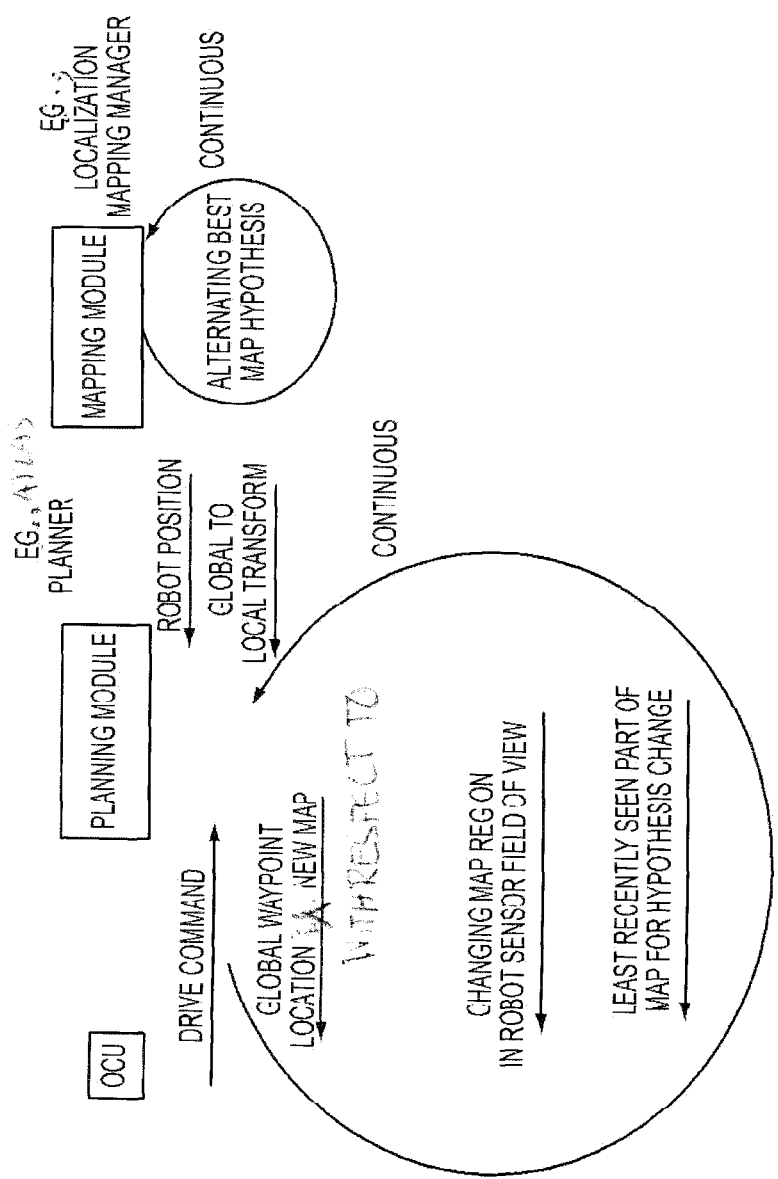
FIG. 24 is a flow diagram showing an exemplary embodiment of the interaction between an OCU, a planning module, and a mapping module to accomplish mapping as the remote vehicle is driven through its environment.

FIG. 22 is a flow diagram for an exemplary process that occurs when a user clicks in a video feed portion of an OCU screen. FIG. 23 is a flow diagram for an exemplary process that occurs when a user clicks in a top-down map view of an OCU screen. FIG. 24 is a flow diagram showing an exemplary embodiment of the interaction between an OCU, a planning module (e.g., an Atlas planner), and a mapping module (e.g., an LMM) to accomplish mapping as the remote vehicle is driven through its environment. Drive commands are sent from the OCU to the planning module. The mapping module sends remote vehicle position and a global-to-local transform to the planning module, and continually determines a best map hypothesis. The planning module continuously sends a global waypoint location (with respect to a new map) to the OCU. The mapping module continuously sends to the OCU: (1) a changing map region that is within the remote vehicle's field of view; and (2) information regarding a least recently seen part of the map for hypothesis change (so that the OCU knows which portions of the map are oldest and therefore least reliable).

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A system comprising:
    a display configured to display a user interface; and
    a data processing device in communication with the display and a remote vehicle, the data processing device capable of:
        navigating the remote vehicle using inputs from the user interface;
        receiving global positioning system information of the remote vehicle for navigation in an outdoor environment;
        receiving laser range finder information and simultaneous localization and mapping information of the remote vehicle for navigation and mapping in the indoor environment;
        mapping an environment about the remote vehicle;
        creating a first navigation portal on one or more maps when the remote vehicle switches from the indoor environment to the outdoor environment, the first navigation portal including information regarding the environment switch from the indoor environment to the outdoor environment;
        creating a second navigation portal on one or more maps when the remote vehicle switches from the outdoor environment to the indoor environment, the second navigation portal including information regarding the environment switch from the outdoor environment to the indoor environment;
        using a door opening behavior when a door is encountered during navigation or mapping;
        creating a third navigation portal on one or more maps when the door is encountered during navigation or mapping, the third navigation portal including instructions to implement the door opening behavior;
        using a stair climbing behavior or a stair descending behavior when a stairway is encountered during navigation or mapping; and
        creating a fourth navigation portal on one or more maps when the stairway is encountered during navigation or mapping, the fourth navigation portal including instructions to implement the stair climbing behavior or the stair descending behavior;
        wherein each navigation portal identifies a transition between two environments, each environment having an associated map.

2. The system of claim 1, wherein the fourth navigation portal associated with the stairway identifies a transition between a first floor environment having an associated first floor map and a second floor environment having an associated second floor map; and
    wherein the third navigation portal associated with the door identifies a transition between a first room environment having an associated first room map and a second room environment having an associated second room map.

3. A navigation system for a remote vehicle control user interface, the navigation system comprising:
    a first map;
    a second map; and
    a portal located in the first map and the second map and identifying a transition between the two maps, the navigation portal facilitating transition of a remote vehicle using the maps between a first environment associated with the first map and a second environment associated with the second map, the navigation portal representing a door,
    wherein the navigation portal includes instructions for implementing one or more behaviors to open the door when the remote vehicle is located in the first environment and an operator of the remote vehicle uses the remote vehicle control interface to designate a destination for the remote vehicle in the second environment, the one or more behaviors comprising a door opening behavior.

4. The system of claim 3, wherein the first environment comprises a first floor of a structure and the second environment comprises a second floor of the structure.

5. The system of claim 4, wherein the one or more behaviors associated with the navigation portal comprises a stair climbing behavior.

6. The system of claim 3, wherein the first environment comprises a second floor and the second environment comprises a first floor.

7. The system of claim 6, wherein the one or more behaviors associated with the navigation portal comprises a stair descending behavior.

8. The system of claim 3, wherein the first environment comprises an outdoor environment and the second environment comprises an indoor environment.

9. The system of claim 8, wherein the navigation portal includes information causing the remote vehicle to switch from outdoor navigation to indoor navigation.

10. The system of claim 9, wherein outdoor navigation comprises GPS-based localization.

11. The system of claim 9, wherein indoor navigation comprises using a laser range finder and simultaneous localization and mapping.

12. The navigation portal of claim 3, wherein the door comprises an elevator door.

13. A method comprising:
    navigating a remote vehicle using inputs from a user interface displayed on an operator control unit in communication with the remote vehicle;
    receiving global positioning system information of the remote vehicle for navigation in an outdoor environment;
    receiving laser range finder information and simultaneous localization and mapping information of the remote vehicle for navigation and mapping in the indoor environment;
    mapping an environment about the remote vehicle;
    creating a first navigation portal on one or more maps when the remote vehicle switches from the indoor environment to the outdoor environment, the first navigation portal including information regarding the environment switch from the indoor environment to the outdoor environment;
    creating a second navigation portal on one or more maps when the remote vehicle switches from the outdoor environment to the indoor environment, the navigation portal including information regarding the environment switch from the outdoor environment to the indoor environment;

using a door opening behavior when a door is encountered during navigation or mapping;

creating a third navigation portal on one or more maps when a door is encountered during navigation or mapping, the third navigation portal including instructions to implement the door opening behavior;

using a stair climbing behavior or a stair descending behavior when a stairway is encountered during navigation or mapping; and creating a fourth navigation portal on one or more maps when a stairway is encountered during navigation or mapping, the fourth navigation portal including instructions to implement the stair climbing behavior or the stair descending behavior;

wherein each navigation portal identifies a transition between two environments, each environment having an associated map.

14. The method of claim 13, further comprising, for outdoor navigation, receiving gyrodometry and stereo vision camera information.

15. The method of claim 13, further comprising, for indoor navigation and mapping, receiving gyrodometry.

16. The method of claim 13, wherein the fourth navigation portal associated with the stairway identifies a transition between a first floor environment having an associated first floor map and a second floor environment having an associated second floor map.

17. The method of claim 13, wherein the third navigation portal associated with the door identifies a transition between a first room environment having an associated first room map and a second room environment having an associated second room map.

18. A method comprising:

navigating a remote vehicle using inputs from a user interface displayed on an operator control unit in communication with the remote vehicle;

receiving laser range finder information and simultaneous localization and mapping information of the remote vehicle for navigation and mapping;

mapping an environment about the remote vehicle;

creating a navigation portal on one or more maps identifying a transition when the remote vehicle switches from a first environment to a second environment, the first environment comprising a first floor of a structure and having an associated first floor map, the second environment comprising a second floor of the structure and having an associated second floor map, the navigation portal representing an elevator door and including information regarding switching between the first environment and the second environment using the navigation portal; and executing a door opening behavior when the elevator door is encountered during navigation or mapping, the navigation portal including instructions to implement the door opening behavior.

* * * * *